United States Patent
Shinkai

(10) Patent No.: US 10,086,659 B2
(45) Date of Patent: Oct. 2, 2018

(54) PNEUMATIC TIRE

(71) Applicant: TOYO TIRE & RUBBER CO., LTD., Osaka-shi, Osaka (JP)

(72) Inventor: Akihiko Shinkai, Osaka (JP)

(73) Assignee: TOYO TIRE & RUBBER CO., LTD., Itami-shi (JP)

(*) Notice: Subject to any disclaimer, the term of this patent is extended or adjusted under 35 U.S.C. 154(b) by 304 days.

(21) Appl. No.: 15/082,636

(22) Filed: Mar. 28, 2016

(65) Prior Publication Data
US 2016/0280016 A1   Sep. 29, 2016

Related U.S. Application Data

(62) Division of application No. 13/397,854, filed on Feb. 16, 2012, now Pat. No. 9,327,559.

(30) Foreign Application Priority Data

Sep. 21, 2011  (JP) ................................. 2011-206346
Jan. 16, 2012  (JP) ................................. 2012-006361

(51) Int. Cl.
   *B60C 11/03*    (2006.01)
   *B60C 19/08*    (2006.01)
   (Continued)

(52) U.S. Cl.
   CPC ............ *B60C 19/082* (2013.01); *B29D 30/52* (2013.01); *B29D 30/60* (2013.01); *B60C 9/02* (2013.01);
   (Continued)

(58) Field of Classification Search
   CPC ..... B60C 19/08; B60C 19/082; B60C 19/084; B60C 19/086; B60C 11/005; B60C 11/0304; B29D 30/60; B29D 2030/526
   See application file for complete search history.

(56) References Cited

U.S. PATENT DOCUMENTS 5,304,270 A   4/1994   Siegenthaler
5,942,069 A   8/1999   Gerresheim et al.
(Continued)

FOREIGN PATENT DOCUMENTS

JP   2-303905 A      12/1990
JP   06-239110 A  *  8/1994
(Continued)

OTHER PUBLICATIONS

Machine translation for Japan 2008-126608 (Year: 2015).*
(Continued)

*Primary Examiner* — Steven D Maki
(74) *Attorney, Agent, or Firm* — Westerman, Hattori, Daniels & Adrian, LLP

(57) ABSTRACT

A pneumatic tire has a tread rubber made of a nonconductive rubber. The tread rubber is provided with a first and second conductive portions made of a conductive rubber. The first conductive portion extends radially inwardly from a ground-contacting surface, extends to one side in tire width direction, and reaches a carcass layer or a side wall rubber. An exposed position of the first conductive portion is separated from a tire equator at a distance is equal to or more than 10% of a ground-contacting width. The second conductive portion extends radially inwardly from the ground-contacting surface, extends to another side in tire width direction, and reaches the carcass layer or the side wall rubber. An exposed position of the second conductive portion is separated from the tire equator at a distance is equal to or more than 10% of the ground-contacting width.

2 Claims, 18 Drawing Sheets

(51) Int. Cl.
    *B29D 30/60* (2006.01)
    *B60C 11/00* (2006.01)
    *B29D 30/52* (2006.01)
    *B60C 9/02* (2006.01)
    *B60C 13/00* (2006.01)
    *B60C 15/00* (2006.01)

(52) U.S. Cl.
    CPC ........ *B60C 11/005* (2013.01); *B60C 11/0304* (2013.01); *B60C 13/00* (2013.01); *B60C 15/00* (2013.01); *B60C 19/08* (2013.01); *B60C 19/084* (2013.01); *B60C 19/086* (2013.01); *B60C 19/088* (2013.01); *B29D 2030/526* (2013.01); *B60C 2011/0341* (2013.01)

(56) References Cited

U.S. PATENT DOCUMENTS

| | | | |
|---|---|---|---|
| 9,327,559 B2 * | 5/2016 | Shinkai | B60C 19/082 |
| 2009/0173419 A1 * | 7/2009 | Kawakami | B29D 30/60 |
| | | | 152/152.1 |
| 2009/0314401 A1 | 12/2009 | Hitotsuyanagi et al. | |
| 2010/0006194 A1 | 1/2010 | Asayama et al. | |
| 2010/0012242 A1 | 1/2010 | Kudo et al. | |
| 2010/0258227 A1 | 10/2010 | Kuroki | |
| 2012/0205020 A1 * | 8/2012 | Kawakami | B60C 19/08 |
| | | | 152/548 |

FOREIGN PATENT DOCUMENTS

| | | | |
|---|---|---|---|
| JP | 6-239110 A | | 8/1994 |
| JP | 2002-46194 A | | 2/2002 |
| JP | 2002-347135 A | | 12/2002 |
| JP | 2007-290485 A | * | 11/2007 |
| JP | 2007-290485 A | | 11/2007 |
| JP | 2008-126608 A | * | 6/2008 |
| JP | 2008-126608 A | | 6/2008 |
| JP | 2009-023152 A | | 2/2009 |
| JP | 2009-113398 A | | 5/2009 |
| JP | 2009-126291 A | | 6/2009 |
| JP | 2010-115935 A | | 5/2010 |
| JP | 2010-222004 A | | 10/2010 |
| JP | 2010-264920 A | | 11/2010 |
| JP | 4783479 B1 | * | 9/2011 |

OTHER PUBLICATIONS

Translation for Japan 2007-290485 (Year: 2018).*
Machine translation for Japan 06-239110 (Year: 2015).*
Machine translation for Japan 4,783,479 B1 (Year: 2018).*
Extended European Search Report dated Dec. 20, 2012, issued in European Patent Application No. 12178010.0. (4 pages).
Japanese Office Action dated May 29, 2013, issued in counterpart Japanese Patent Application No. 2012-006361 (3 pages).
Chinese Office Action dated Aug. 26, 2014, issued in counterpart CN Application No. 201210208839.5, with English Translation. (21 pages).

* cited by examiner

PNEUMATIC TIRE

CROSS-REFERENCE TO RELATED APPLICATIONS

This application is a divisional of application Ser. No. 13/397,854, filed on Feb. 16, 2012, which is based upon and claims the benefit of priority of the prior Japanese Patent Application No. 2011-206346, filed on Sep. 21, 2011 and Japanese Patent Application No. 2012-006361, filed on Jan. 16, 2012, the entire contents of which are incorporated herein by reference.

BACKGROUND OF THE INVENTION

Field of the Invention

The present invention relates to a pneumatic tire which can discharge a static electricity generated in a vehicle body and a tire, to a road surface, and a manufacturing method of the pneumatic tire.

Description of the Related Art

Recently, there have been proposed a pneumatic tire including a tread rubber blended with silica at a high ratio in order to reduce the rolling resistance that largely affects the fuel consumption of a vehicle and/or to increase braking performance (WET braking performance) on a wet road surface. However, compared to a tread rubber blended with carbon black at a high ratio, the electric resistance of such tread rubber is high, and accordingly, static charge generated on a vehicle body or the tire is prevented from being released to the road surface. As a result, problems like radio noises tend to occur.

Accordingly, there has been developed a pneumatic tire structured such that a tread rubber constructed by a nonconductive rubber blended with a silica or the like is provided with a conductive portion constructed by a conductive rubber blended with a carbon black or the like, whereby an electrical conduction performance can be achieved. For example, in a tire described in Japanese Unexamined Patent Publication No. 2010-115935, a conductive portion extending in a tire radial direction from a ground-contacting surface so as to reach a belt layer is provided in a tread rubber which is formed by a non-conductive rubber, thereby forming a conductive route for discharging a static electricity. However, in the tire, since the conductive route is formed via the belt layer, it can not correspond to the case that a topping rubber of the belt layer is formed by a non-conductive rubber.

On the other hand, in a pneumatic tire described in Japanese Unexamined Patent Publication No. 2009-126291, a tread rubber formed by a non-conductive rubber is provided with a conductive portion which extends to an inner side in a tire radial direction from a ground-contacting surface, extends only to one side in a tire width direction between a cap portion and a base portion, and is connected to a side wall rubber or a topping rubber in a carcass layer. However, since the conductive portion formed as an L-shaped cross sectional form as mentioned above is formed such a shape as to be one-sided in the tire width direction, there has been found that it causes a reduction of productivity and a deterioration of uniformity.

In other words, in order to make a profile of the tread rubber symmetrical in the tire having the conductive portion mentioned above, there is generated such a necessity that a thickness of a cap portion is differentiated between left and right sides by taking a thickness of the conductive portion into consideration, thereby causing a complication of a manufacturing step, and further a reduction of a productivity. Further, since a rigidity of the tread rubber is different between a side in which the conductive portion is provided and a side in which it is not provided, uniformity in a lateral direction of the tire tends to be deteriorated, and especially a lateral force variation (LFV) tends to become large. The same matter was indicated in Japanese Unexamined Patent Publication No. 2010-264920 by the same applicant as the Japanese Unexamined Patent Publication No. 2009-126291.

In addition, in the tire mentioned above, since an exposed position of the conductive portion in the ground-contacting surface exists in the vicinity of a tire equator, it tends to come to a covered state in which an upper end of the conductive portion to be exposed to the ground-contacting surface is covered by a thin skin of the non-conductive rubber. It is thought that this is caused by such a factor that the tread rubber gets together to the center portion in correspondence to a change of a cord angle of the belt layer due to a diameter expansion of the tire at a time of a cure molding. The tire which is manufactured while remaining in the covered state cannot achieve an electrical conduction performance in the early stage of a wear, which poses a problem.

SUMMARY OF THE INVENTION

The present invention is made by taking the actual condition mentioned above into consideration, and an object of the present invention is to provide a pneumatic tire which can well achieve an electrical conduction performance by preventing a covered state, as well as suppressing a reduction of a productivity and a deterioration of a uniformity, and a manufacturing method of the pneumatic tire.

The object can be achieved by the following present invention. That is, the present invention provides a pneumatic tire comprising a pair of bead portions, side wall portions each of which extends to an outer side in a tire radial direction from each of the bead portions, a tread portion which is connected to an outer end in the tire radial direction of each of the side wall portions, a toroidal carcass layer which is provided between the pair of bead portions, a side wall rubber which is provided in an outer side of the carcass layer in the side wall portion, and a tread rubber which is provided in an outer side of the carcass layer in the tread portion, wherein the tread rubber has a cap portion which is formed by a nonconductive rubber and constructs a ground-contacting surface, a base portion which is formed by the nonconductive rubber and is provided in an inner side in the tire radial direction of the cap portion, and a pair of conductive portions which are formed by a conductive rubber and are exposed in the ground-contacting surface, and wherein the pair of conductive portions comprises a first conductive portion which extends to an inner side in the tire radial direction from the ground-contacting surface so as to reach an outer peripheral surface of the base portion, extends to one side in a tire width direction between the cap portion and the base portion, is connected to a topping rubber of the carcass layer or the side wall rubber, and is separated at an exposed position on the ground-contacting surface from a tire equator to one side in the tire width direction at a distance which is equal to or more than 10% of a ground-contacting width, and a second conductive portion which extends to an inner side in the tire radial direction from the ground-contacting surface so as to reach an outer peripheral surface of the base portion, extends to another side in the tire width direction between the cap portion and the base portion, is connected to the topping rubber of the carcass layer or the side wall rubber, and is separated at an exposed position on the ground-contacting surface from the tire equator to another side in the tire width direction at a distance which is equal to or more than 10% of the ground-contacting width.

In the pneumatic tire in accordance with the present invention, a pair of conductive portions which are provided in the tread rubber are constructed by the first conductive portion and the second conductive portion as mentioned above, and the conductive portions are formed respectively in the one side and the another side in the tire width direction. Accordingly, the thickness of the cap portion and the rigidity of the tread rubber are not greatly different between the right and left sides, and it is possible to suppress the reduction of the productivity and the deterioration of the uniformity. In addition, since the exposed positions on the ground-contacting surface of the first and second conductive portions are away from the tire equator at the distance which is equal to or more than 10% of the ground-contacting width, it is possible to well achieve the electrical conduction performance by preventing the covered state.

In the pneumatic tire in accordance with the present invention, it is preferable that a circumferential main groove is formed on a surface of the tread rubber, while avoiding a section in which the first conductive portion and the second conductive portion extend to the inner side in the tire radial direction from the ground-contacting surface so as to reach an outer peripheral surface of the base portion. In accordance with the structure mentioned above, there is no risk that the conductive portion is segmented by the circumferential main groove, and it is possible to stably achieve the electrical conduction performance.

In the pneumatic tire in accordance with the present invention, it is preferable that a groove area of a region which comes to one side in the tire width direction of the ground-contacting surface is larger than a groove area of a region which comes to another side in the tire width direction based on the tire equator, and a distance from the exposed position on the ground-contacting surface of the first conductive portion to the tire equator is longer than a distance from the exposed position on the ground-contacting surface of the second conductive portion to the tire equator. In accordance with the structure mentioned above, since it is possible to improve a lateral rigidity balance in the tread rubber in which an asymmetrical pattern having different groove areas between the right and left sides is formed, it becomes advantageous for improving uniformity in a lateral direction of the tire.

Further, the present invention provides a manufacturing method of a pneumatic tire comprising a forming step of a tread rubber which is provided with a base portion in an inner side in a tire radial direction of a cap portion constructing a ground-contacting surface, wherein the forming step of the tread rubber comprises a stage of forming the base portion by a nonconductive rubber, a stage of forming a first cap portion which comes to one side portion in the tired width direction of the cap portion, by spirally winding a first rubber ribbon constructed by the nonconductive rubber along a tire circumferential direction, on an outer peripheral surface in one side in a tire width direction of the base portion, and a stage of forming a second cap portion which comes to another side portion in the tire width direction of the cap portion, by spirally winding a second rubber ribbon constructed by the nonconductive rubber along the tire circumferential direction, on an outer peripheral surface in another side in the tire width direction of the base portion, wherein the stage of forming the first cap portion partly sets a conductive rubber in the first rubber ribbon in the course of winding, and forms a first conductive portion which extends to an inner side in the tire radial direction from a position on the ground-contacting surface which is separated from the tire equator to one side in the tire width direction at a distance which is equal to or more than 10% of a ground-contacting width so as to reach an outer peripheral surface of the base portion, and extends to one side in the tire width direction between the cap portion and the base portion, by the conductive rubber, and wherein second stage of forming the second cap portion partly sets the conductive rubber in the second rubber ribbon in the course of winding, and forms a second conductive portion which extends to the inner side in the tire radial direction from a position on the ground-contacting surface which is separated from the tire equator to another side in the tire width direction at a distance which is equal to or more than 10% of the ground-contacting width so as to reach the outer peripheral surface of the base portion, and extends to another side in the tire width direction between the cap portion and the base portion, by the conductive rubber.

In accordance with the manufacturing method of the pneumatic tire of the present invention, the first conductive portion and the second conductive portion as mentioned above are simply and easily formed, in the stage of forming the cap portion by winding the rubber ribbon, in the forming step of the tread rubber. And, in the manufactured pneumatic tire, it is possible to suppress the reduction of the productivity and the deterioration of the uniformity, and it is possible to well achieve the electrical conduction performance by preventing the covered state.

As a preferable aspect in the manufacturing method of the pneumatic tire of the present invention, there is a method in which in the stage of forming the first cap portion, the winding position of the first rubber ribbon moves to the another side in the tire width direction from a start point which is separated from the tire equator to the one side in the tire width direction, next turns back to the one side in the tire width direction so as to pass through the start point, next passes through an end portion in the one side in the tire width direction of the base portion, and thereafter turns back to the another side in the tire width direction so as to reach an endpoint, and the conductive rubber for forming the first conductive portion is provided in the first rubber ribbon, in a section from a position which is after turning back to the one side in the tire width direction and before passing through the start point, to a position which passes through the end portion in the one side in the tire width direction of the base portion, or in the stage of forming the second cap portion, the winding position of the second rubber ribbon moves to the one side in the tire width direction from a start point which is separated from the tire equator to the another side in the tire width direction, next turns back to the another side in the tire width direction so as to pass through the start point, next passes through an end portion in the another side in the tire width direction of the base portion, and thereafter turns back to the one side in the tire width direction so as to reach an end point, and the conductive rubber for forming the second conductive portion is provided in the second rubber ribbon, in a section from a position which is after turning back to the another side in the tire width direction and before passing through the start point, to a position which passes through the end portion in the another side in the tire width direction of the base portion.

With this method, it is possible to efficiently and accurately provide the first conductive portion or the second conductive portion at a time of forming the cap portion by winding the rubber ribbon. Further, since the start point and the end point for winding the rubber ribbon are set so as to be spaced at the distance which is at least 10% of the ground-contacting width from the tire equator, it is possible to prevent an increase of a radial run out (RRO) so as to improve the uniformity. The RRO means a change amount in a vertical direction of the rotating shaft at a time of rotating the tire.

In the above aspect, it is preferable that the end portion in the another side in the tire width direction of the first cap portion is formed as a tapered shape in the stage of forming the first cap portion, and the end portion in the one side in the tire width direction of the second cap portion is formed so as to be overlapped with the end portion in the another side in the tire width direction of the first cap portion, in the stage of forming the second cap portion. With this method, since it becomes easy to connect the second cap portion to the first cap portion, and it is possible to form the cap portion by winding the rubber ribbon at two times (winding the first rubber ribbon and winding the second rubber ribbon), the productivity is improved.

In the above aspect, it is conceivable that the forming step of the tread rubber includes a stage of forming a third cap portion which comes to a center portion in the tire width direction of the cap portion by the nonconductive rubber, and the end portion in the another side in the tire width direction of the first cap portion is overlapped with the end portion in the one side in the tire width direction of the third cap portion, and the end portion in the one side in the tire width direction of the second cap portion is overlapped with the end portion in the another side in the tire width direction of the third cap portion. In this case, it is possible to suppress the range in which the first and second rubber ribbons are wound, and it is possible to well improve the uniformity by appropriately setting the start point and the end point away from the tire equator, and effectively preventing the increase of the RRO.

As a preferable aspect in the manufacturing method of the pneumatic tire of the present invention, there is a method in which the forming step of the tread rubber includes a stage of forming a third cap portion which comes to a center portion in the tire width direction of the cap portion by the nonconductive rubber, and in the stage of forming the first cap portion, the winding position of the first rubber ribbon moves to the another side in the tire width direction from a start point which is separated from the tire equator to the one side in the tire width direction, next turns back to the one side in the tire width direction so as to pass through the start point, next passes through an end portion in the one side in the tire width direction of the base portion, and thereafter turns back to the another side in the tire width direction so as to reach an end point, and the conductive rubber for forming the first conductive portion is provided in the first rubber ribbon, in a section from the start point to a position which turns back to the one side in the tire width direction, and a section which is just after passing through the start point, to a position which passes through the end portion in the one side in the tire width direction of the base portion, or in the stage of forming the second cap portion, the winding position of the second rubber ribbon moves to the one side in the tire width direction from a start point which is separated from the tire equator to the another side in the tire width direction, next turns back to the another side in the tire width direction so as to pass through the start point, next passes through an end portion in the another side in the tire width direction of the base portion, and thereafter turns back to the one side in the tire width direction so as to reach an end point, and the conductive rubber for forming the second conductive portion is provided in the second rubber ribbon, in a section from the start point to a position which turns back to the another side in the tire width direction, and a section which is just after passing through the start point, to a position which passes through the end portion in the another side in the tire width direction of the base portion.

With this method, it is possible to efficiently and accurately provide the first conductive portion or the second conductive portion at a time of forming the cap portion by winding the rubber ribbon. Further, it is possible to suppress the range in which the first and second rubber ribbons are wound, by forming the third cap portion in the center portion. In addition, since it is possible to set the start point and the endpoint for winding the rubber ribbon greatly away from the tire equator, it is possible to effectively prevent the increase of the RRO so as to well improve the uniformity.

In the above aspect, it is preferable that both end portions in the tire width direction of the third cap portion are formed as a tapered shape in the stage of forming the third cap portion, the end portion in the another side in the tire width direction of the first cap portion is formed so as to be overlapped with the end portion in the one side in the tire width direction of the third cap portion, in the stage of forming the first cap portion, and the end portion in the one side in the tire width direction of the second cap portion is formed so as to be overlapped with the end portion in the another side in the tire width direction of the third cap portion, in the stage of forming the second cap portion. With this method, since it becomes easy to connect the first cap portion and the second cap portion to the third cap portion, the productivity is improved.

In the manufacturing method of the pneumatic tire in accordance with the present invention, it is preferable that the forming step of the tread rubber includes the stage of forming the inner cap which becomes narrower than the base portion in the center portion in the tire width direction of the outer peripheral surface of the base portion by the nonconductive rubber, and the cap portion is formed in such a manner as to cover the inner cap. In accordance with this, it is possible to easily secure the thickness of the center portion of the tread rubber, and it is easy to form the tread rubber in accordance with the desired shape. Further, if the stage of forming the inner cap and the stage of forming the cap portion are carried out by the different manufacturing lines, it is possible to shorten the cycle time.

DETAILED DESCRIPTION OF PREFERRED EMBODIMENTS

An embodiment of the present invention will be explained with reference to the drawings.

Structure of Pneumatic Tire

Figure 1:
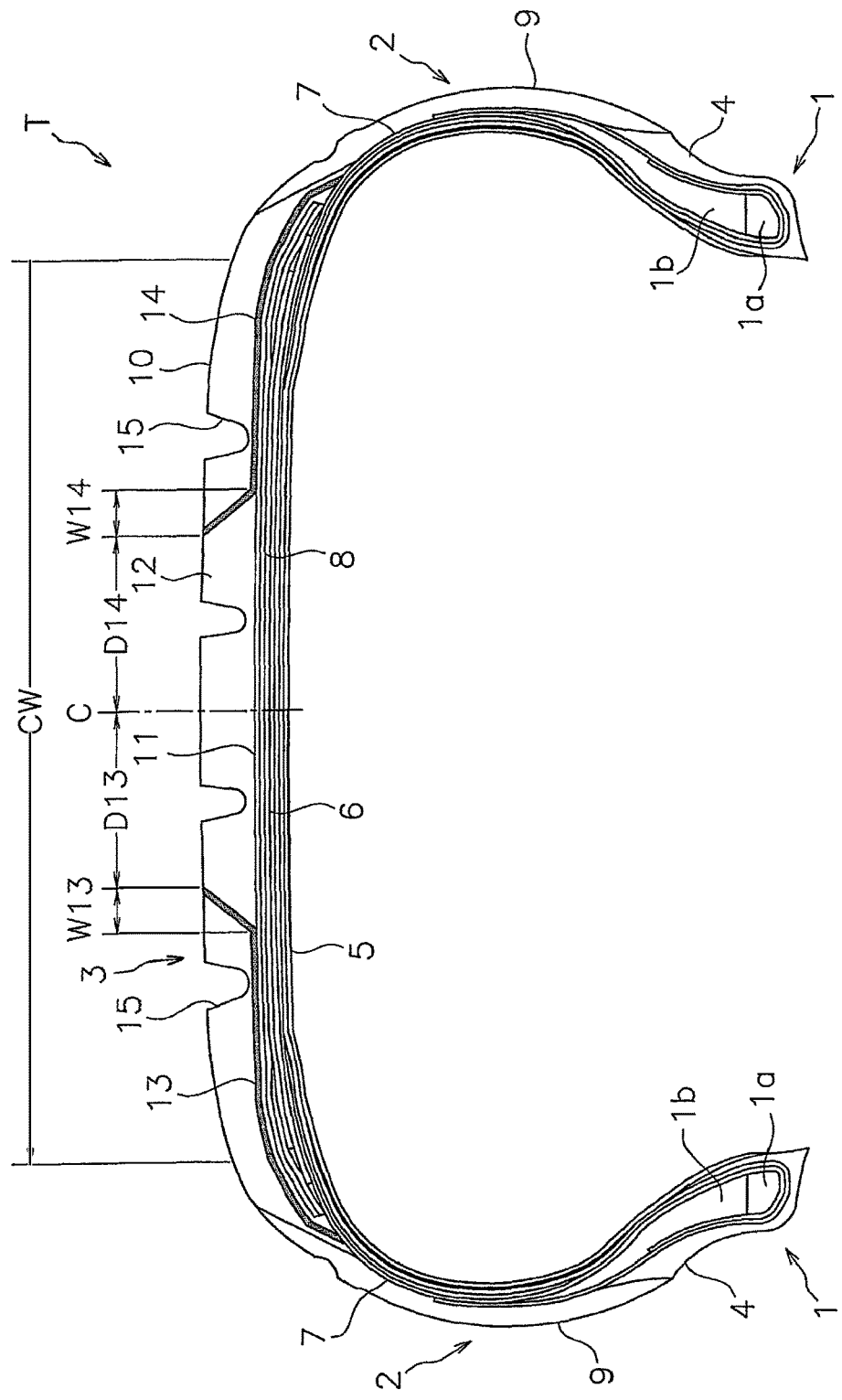
FIG. 1 is a cross sectional view of a tire meridian showing one example of a pneumatic tire according to the present invention.

A pneumatic tire T shown in FIG. 1 is provided with a pair of bead portions 1, side wall portions 2 each of which extends to an outer side in a tire radial direction from each of the bead portions 1, a tread portion 3 which is connected to an outer end in the tire radial direction of each of the side wall portions 2, and a toroidal carcass layer 7 which is provided between a pair of bead portions 1. The bead portion 1 includes an annular bead core 1a composed of a bundle of steel wires or the like sheathed with rubber and a bead filler 1b made of hard rubber disposed therein.

The carcass layer 7 is constructed by at least one (two in the present embodiment) carcass ply, and an end portion thereof is fixed in a state in which it is wound up via a bead core 1a. The carcass ply is formed by covering a cord extending at an angle of approximately 90° with respect to the tire circumferential direction with a topping rubber. An inner liner rubber 5 for maintaining air pressure is provided on the inside of the carcass layer 7.

Further, this tire T is provided with a side wall rubber 9 which is provided in an outer side of the carcass layer 7 in the side wall portion 2, and a tread rubber 10 which is provided in an outer side of the carcass layer 7 in the tread portion 3. A rim strip rubber 4 which comes into contact with a rim (not shown) at a time of being installed to the rim is provided in an outer side of the carcass layer 7 in the bead portion 1. In the present embodiment, the topping rubber of the carcass layer 7 (the topping rubber of the carcass ply) and the rim strip rubber 4 are formed of conductive rubber respectively, and the side wall rubber 9 is formed of nonconductive rubber.

An inner side in the tire radial direction of the tread rubber 10 is provided with a belt layer 6 which is constructed by a plurality of (two in the present embodiment) belt plies, and a belt reinforcing layer 8 which is formed by covering a cord extending substantially in a tire circumferential direction with a topping rubber. Each of the belt plies is formed by covering a cord extending while inclining with respect to the tire circumferential direction with a topping rubber, and is laminated in such a manner that the cord intersects inversely to each other between the plies. A belt reinforcing layer 8 may be omitted as occasion demands.

The tread rubber 10 has a cap portion 12 which is formed by a nonconductive rubber and constructs a ground-contacting surface, a base portion 11 which is formed by the nonconductive rubber and is provided in an inner side in the tire radial direction of the cap portion 12, and a pair of conductive portions which are formed by a conductive rubber and is exposed in the ground-contacting surface. These pair of conductive portions are constructed by a first conductive portion 13 (hereinafter, refer simply to as "conductive portion 13") and a second conductive portion 14 (hereinafter, refer simply to as "conductive portion 14"). In order to achieve an easy discrimination on the drawings, the conductive portion is colored by a black in FIG. 1 and the like.

Figure 2:
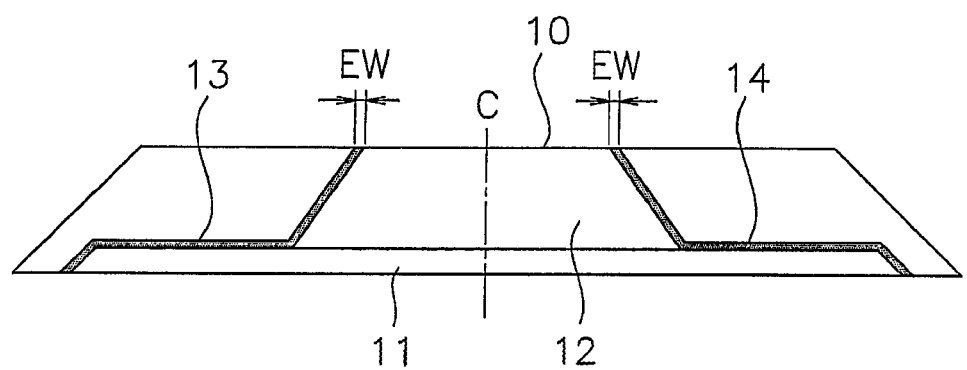
FIG. 2 is a cross sectional view schematically showing a tread rubber before a cure molding.

A rubber hardness of the tread rubber 10 is not particularly limited, however, it is possible to suppress an early wear by making the rubber hardness of the cap portion 12 higher than the rubber hardness of the base portion 11, for example, thereby setting a hardness difference thereof to 1 to 20 degree. The rubber hardness is measured at 25° C. in accordance with a durometer hardness test (type A) of JISK6253. The rubber hardness of the base portion 11 may be made higher than the rubber hardness of the cap portion 12. FIG. 2 schematically shows the tread rubber 10 before the cure molding.

The conductive rubber points to a rubber in which a specific volume resistance is less than $10^8$ Ω·cm, and is produced, for example, by blending a carbon black serving as a reinforcing agent in a raw material rubber at a high ratio. The carbon black is blended, for example, by 30 to 100 phr with respect to 100 phr of the rubber component. The conductive rubber can be obtained by blending a predetermined amount of known conductivity applying material such as a carbon including a carbon fiber, a graphite and the like, or a metal including a metal powder, a metal oxide, a metal flake, a metal fiber and the like in addition to the carbon black.

Further, the nonconductive rubber points to a rubber in which a specific volume resistance is equal to or more than $10^8$ Ω·cm, and is produced, for example, by blending a silica serving as the reinforcing agent in the raw material rubber at a high ratio. The silica is blended, for example, at 30 to 100 phr with respect to 100 phr of the rubber component. As the silica, a wet type silica can be preferably employed, however, any material which is generally used as a reinforcing material can be used without limitation. The non-conductive rubber may be produced by blending a calcined clay, a hard clay, a calcium carbonate or the like in addition to the silica such as a precipitated silica, a silicic anhydride or the like.

As for the raw material rubber mentioned above, the following are exemplified; i.e., natural rubber, styrene-butadiene rubber (SBR), butadiene rubber (BR), isoprene rubber (IR), butyl rubber (IIR) and the like. These materials may be used alone or in combination. The above raw rubber is appropriately blended with a curing agent, a cure accelerator, a plasticizer, an antioxidant and the like.

The conductive portion 13 extends to an inner side in the tire radial direction from the ground-contacting surface so as to reach an outer peripheral surface of the base portion 11, extends to one side (which may be, hereinafter, often described as "left side") in the tire width direction between the cap portion 12 and the base portion 11, and is connected to a topping rubber of the carcass layer 7. An exposed position on the ground-contacting surface of the conductive portion 13 is separated from a tire equator C to the left side at a distance D13, and the distance D13 is equal to or more than 10% of a ground-contacting width CW.

The conductive portion 14 extends to an inner side in the tire radial direction from the ground-contacting surface so as to reach an outer peripheral surface of the base portion 11, extends to another side (which may be, hereinafter, often described as "right side") in the tire width direction between the cap portion 12 and the base portion 11, and is connected to a topping rubber of the carcass layer 7. An exposed position on the ground-contacting surface of the conductive portion 14 is separated from a tire equator C to the right side at a distance D14, and the distance D14 is equal to or more than 10% of a ground-contacting width CW.

The tire T is provided with a conductive route for discharging a static electricity to a road surface. The conductive route has two ways, one of them is a route which comes to the ground-contacting surface from the rim via the left rim strip rubber 4, the topping rubber of the carcass layer 7 and the conductive portion 13, and another is a route which comes to the ground-contacting surface from the rim via the right rim strip rubber 4, the topping rubber of the carcass layer 7 and the conductive portion 14. Accordingly, it is possible to form the topping rubbers of the belt layer 6 and the belt reinforcing layer 8 by the nonconductive rubber.

In this pneumatic tire T, an L-shaped conductive portion is formed in each of right and left sides of the tread rubber 10, that is, one side and another side in the tire width direction. With this configuration, in comparison with a case that the conductive portion is provided only in one side, a thickness of the cap portion 12 and a rigidity of the tread rubber 10 are not greatly different between the right and left sides, and it is possible to suppress a reduction of a productivity and a deterioration of a uniformity. Further, since the exposed positions on the ground-contacting surface of the conductive portions 13 and 14 are separated from the tire equator C at a predetermined distance, it is possible to prevent a covered state so as to well achieve an electrical conduction performance.

As mentioned above, the conductive portions 13 and 14 are not exposed in the vicinity of the tire equator C, but are exposed in so-called mediate portions which are separated from the tire equator C at distances D13 and D14, thereby preventing the covered state. In the light of securing the electrical conduction performance in the early stage of a wear, each of the distances D13 and D14 is preferably equal to or more than 20% of the ground-contacting width CW, is more preferably equal to or more than 30% of the ground-contacting width CW, is further preferably more than 30% of the ground-contacting width CW, and is further more preferably equal to or more than 40% of the ground-contacting width CW. An exposure width (refer to FIG. 2) of the conductive portions 13 and 14 is, for example, between 0.1 and 1.0 mm.

The conductive portion 13 and the conductive portion 14 are not limited to be arranged symmetrically with respect to the tire equator C, but may be arranged asymmetrically as being exemplified later. Even if the arrangement of the conductive portions 13 and 14 is asymmetrical, an improving effect can be obtained by providing the conductive portion in each of one side and another side in the tire width direction, and it is possible to suppress the reduction of the productivity and the deterioration of the uniformity in comparison with the case that the conductive portion is provided only in one side. In order to enhance the uniformity in the lateral direction of the tire, it is preferable to make the difference between the distance D13 and the distance D14 small, depending on a tread pattern.

The ground surface to which the conductive portion 13 and 14 are exposed indicates the surface of the tread portion grounding on the road surface at a time when the tire is put vertically on the flat road surface in a state of being assembled in a normal rim and being filled with a normal internal pressure, and a normal load is applied. The ground-contacting width CW indicates a width in the tire width direction of the ground-contacting surface. The normal rim is a rim which is determined per tire by a standard system including a standard on which the tire is based, for example, is a standard rim in JATMA, "Design Rim" in TRA, or "Measuring Rim" in ETRTO.

The normal internal pressure is a pneumatic pressure determined per tire by a standard system including a standard on which the tire is based, and is a maximum pneumatic pressure in JATMA, a maximum value described in Table "TIRE LOAD LIMITS AT VARIOUS COLD INFLATION PRESSURES" in TRA, or "INFLATION PRESSURE" in ETRTO, however, in the case that the tire is for a passenger car, it is set to 200 kPa. Further, the normal load is a load determined per tire by a standard system including a standard on which the tire is based, and is a maximum load capacity in JATMA, a maximum value described in Table mentioned above in TRA, or "LOAD CAPACITY" in ETRTO, however, in the case that the tire is for a passenger car, it is set to 80% of the maximum load capacity.

Each of the conductive portions 13 and 14 extends so as to be inclined with respect to the tire radial direction, in a section in which it extends to the inner side in the tire radial direction from the ground-contacting surface and reaches an outer peripheral surface of the base portion 11. In such a structure that the conductive portions 13 and 14 are inclined as mentioned above, it is easy to form the conductive portions 13 and 14 at a time of forming the tread rubber 10 in accordance with a step mentioned below, and it is advantageous. Further, the conductive portion 13 and the conductive portion 14 are inclined inversely to each other, whereby a rigidity balance between the right and left becomes good, and uniformity in the lateral direction of the tire is enhanced.

In the surface of the tread rubber 10, a plurality of main grooves 15 extending along the tire circumferential direction are formed while avoiding such a section that the conductive portion 13 and the conductive portion 14 reach the outer peripheral surface of the base portion 11 from the ground-contacting surface. With this configuration, there is no risk that the conductive portions 13 and 14 are segmented at a time of pressing a projection onto the surface of the tread rubber 10 in FIG. 2 so as to form the circumferential main groove 15, in a step of curing a green tire, and it is possible to stably achieve an electrical conduction performance. Widths of inclination W13 and W14 are respectively widths of portions in which the conductive portions 13 and 14 are inclined, and are measured in a section from the ground-contacting surface to the outer peripheral surface of the base portion 11.

In order to avoid an interference between the conductive portions 13 and 14 and the circumferential main groove 15, each of the inclination widths W13 and W14 is preferably equal to or less than 20 mm, and a rate thereof with respect to the ground-contacting width CW is preferably equal to or less than 10%. Further, since a fluctuation of the exposed positions of the conductive portions 13 and 14 accompanied with the wear of the tread rubber 10 becomes small, there can be obtained such an advantage that they are hard to be exposed to a constraint of a pattern design. The conductive portions 13 and 14 may extend approximately in parallel to a tire radial direction from the ground-contacting surface toward the outer peripheral surface of the base portion 11.

In the present embodiment, there is shown an example in which the conductive portions 13 and 14 are connected to the topping rubber of the carcass layer 7, however, without being limited to this, the conductive portions 13 and 14 may be connected to the side wall rubber 9 formed by the conductive rubber. In this case, since there is provided a conductive route which reaches the ground-contacting surface from the rim via the rim strip rubber 4, the side wall rubber 9 and the conductive portions 13 and 14, it is possible to form the topping rubber of the carcass layer 7 by the nonconductive rubber. As mentioned above, the conductive portions 13 and 14 are connected to the topping rubber of the carcass layer 7 or the side wall rubber 9 which can be conducted electrically from the rim at a time of being installed to the rim.

In the present embodiment, there is employed a side-on tread structure in which an end portion of the side wall rubber 9 is mounted to an end portion of the tread rubber 10, however, it is possible to employ a tread-on side structure in which the end portion of the tread rubber 10 is mounted to the end portion of the side wall rubber 9, in place of this. In this case, a desired conductive route can be provided by connecting the conductive portions 13 and 14 to the side wall rubber 9 which is formed by the conductive rubber.

Figure 3:
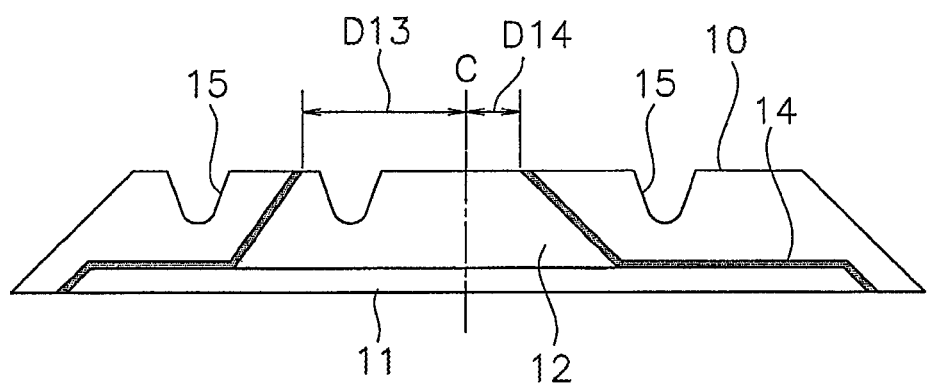
FIG. 3 is a cross sectional view schematically showing a tread rubber having an asymmetrical pattern.

An asymmetrical pattern in which a groove area is different between the right and left sides is formed in the tread rubber 10 shown in FIG. 3, and the groove area in a region coming to the left side of the ground-contacting surface is larger than the groove area of a region coming to the right side, based on the tire equator C. In a calculation of the groove area in the ground-contacting surface, a lateral groove and a narrow groove which are not illustrated are considered, in addition to the circumferential main groove 15. The asymmetrical pattern mentioned above is used, for example, for the purpose of arranging a region in which the groove area is relatively smaller in an outer side of a vehicle, thereby enhancing steering stability. In a tire in which an installing direction is designated, a direction of installation to the vehicle is displayed on the side wall portion 2.

In an example in FIG. 3, the distance D13 from the exposed position of the conductive portion 13 on the ground-contacting surface to the tire equator C is longer than the distance D14 from the exposed position of the conductive portion 14 on the ground-contacting surface to the tire equator C. With this configuration, since it is possible to improve the rigidity balance between the right and left sides in the tread rubber in which the asymmetrical pattern is formed, it becomes advantageous in order to improve the uniformity in the lateral direction of the tire. In the case that the groove area of the right region in the ground-contacting surface is relatively large, it is effective to make the distance D14 longer than the distance D13.

The tread rubber provided in the tire in accordance with the present invention can be formed by an extrusion forming method, however, it is preferable to form it in accordance with a ribbon winding construction method in the light of improving the uniformity, and it is possible to use them together. The extrusion forming method is a construction method of extrusion forming an uncured band-like rubber member having a desired cross sectional shape and jointing end portions to each other so as to form an annular shape. The ribbon winding construction method is a construction method of spirally winding an uncured rubber ribbon having a small width in a tire circumferential direction and forming a rubber member having a desired cross sectional shape.

Manufacturing Method of Pneumatic Tire

Next, a description will be given of a method of manufacturing the pneumatic tire T. Since the pneumatic tire T can be manufactured in the same manner as the conventional tire manufacturing step except a point relating to the tread rubber 10, a description will be given mainly of a forming step of the tread rubber.

First Aspect Relating to Forming Step of Tread Rubber

Figure 4A:
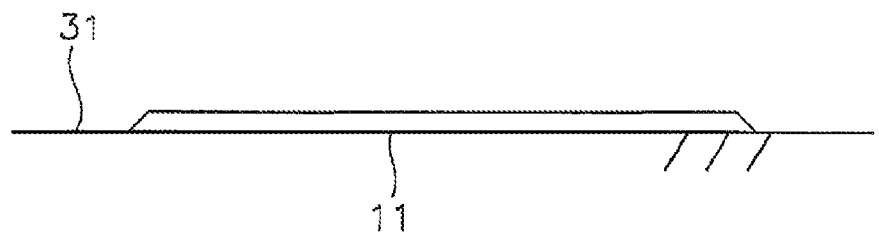
FIGS. 4(A) to 4(C) are cross sectional views schematically showing a forming step of the tread rubber.

First of all, as shown in FIG. 4(A), a base portion 11 is formed by a nonconductive rubber on an outer peripheral surface of a rotation support body 31 mentioned below. Although an illustration is omitted, a belt layer 6 and a belt reinforcing layer 8 are provided previously on an outer peripheral surface of the rotation support body 31, and the base portion 11 is formed on them. Any of the extrusion forming method and the ribbon winding construction method may be used to form the base portion 11.

Figure 4B:
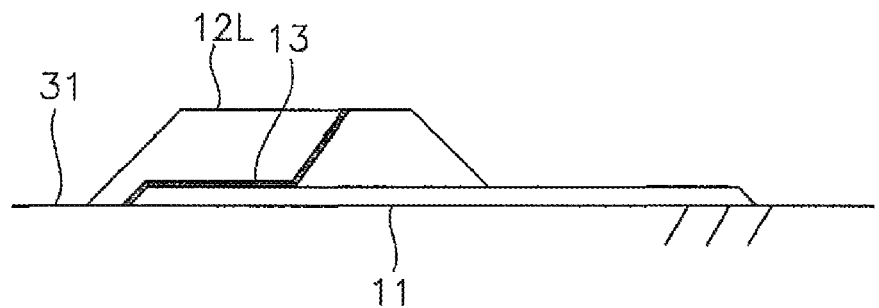

Next, as shown in FIG. 4(B), a first cap portion 12L coming to a left portion of the cap portion 12 is formed in an outer peripheral surface in a left side of the base portion 11. The first cap portion 12L is formed by spirally winding a first rubber ribbon 20 constructed by a nonconductive rubber 21 shown in FIG. 5 along the tire circumferential direction, while utilizing the ribbon winding construction method.

Figure 5A:
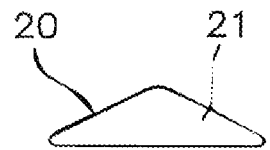
FIGS. 5(A) and 5(B) are cross sectional views of a rubber ribbon.
Figure 5B:
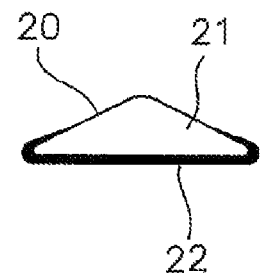

The rubber ribbon 20 is formed by the nonconductive rubber 21 as shown in FIG. 5(A), however, is partly provided with a conductive rubber 22 as shown in FIG. 5(B) as occasion demands. At a time of winding, a lower side in FIG. 5 comes to an inner peripheral side which faces the rotation support body 31. Accordingly, in the rubber ribbon 20 in FIG. 5(B), an inner peripheral side surface of the nonconductive rubber 21 is covered with the conductive rubber 22. A cross section of the rubber ribbon 20 is not limited to a triangular shape, but may be formed as the other shapes such as an oval shape, a rectangular shape and the like.

Figure 6:
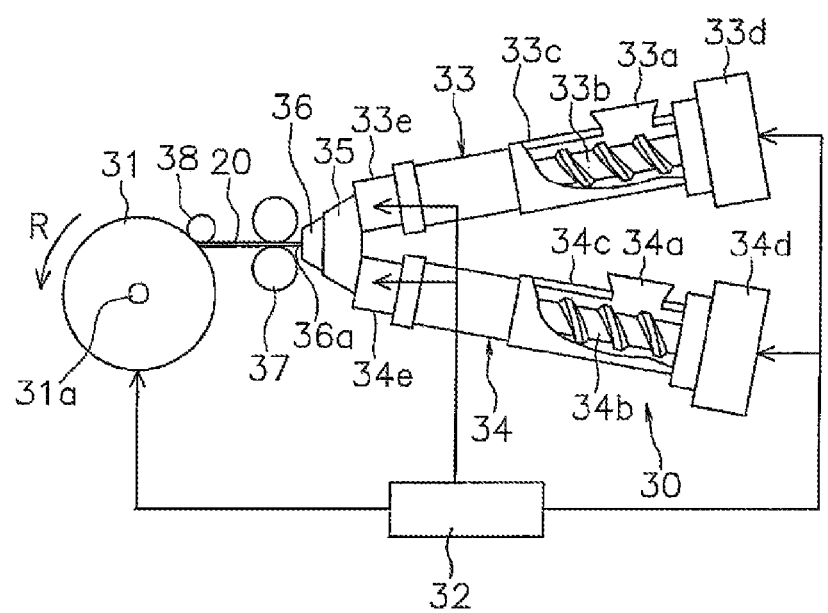
FIG. 6 is a view showing manufacturing equipment for carrying out a winding of the rubber ribbon.

The forming and the winding of the rubber ribbon 20 can be carried out by using an equipment as exemplified in FIG. 6. This equipment is provided with a rubber ribbon supply apparatus 30 which can form a double-layered rubber ribbon 20 by co-extruding two kinds of rubbers, a rotational support body 31 around which the rubber ribbon 20 supplied from the rubber ribbon supply apparatus 30 is wound, and a control apparatus 32 which carries out an actuation control of the rubber ribbon supply apparatus 30 and the rotational support body 31. The rotational support body 31 is structured such that it can rotate in a direction R around an axis 31a and move in an axial direction.

An extruding machine 33 is provided with a hopper 33a, a screw 33b, a barrel 33c, a drive apparatus 33d of the screw 33b, and a head portion 33e having a gear pump built-in. In the same manner, an extruding machine 34 is provided with a hopper 34a, a screw 34b, a barrel 34c, a drive apparatus 34d and a head portion 34e. A rubber combining portion 35 additionally provided with a die 36 is provided in leading ends of a pair of extruding machines 33 and 34.

If the nonconductive rubber corresponding to the rubber material is introduced in the hopper 33a, and the conductive rubber corresponding to the rubber material is introduced in the hopper 34a, the respective rubbers are fed out forward while being mixed by the screws 33b and 34b, passed by the head portion 33e and 34e, combined in a predetermined shape at the rubber combining portion 35, and extruded as the double-layered rubber ribbon 20 from a discharge port 36a. The formed rubber ribbon 20 is fed out forward by a roll 37, and is wound around the rotational support body 31 while being pressed by a roller 38.

If the extrusion of the conductive rubber is stopped by inhibiting a rotation of a gear pump within a head portion 34e, and inhibiting a rotation of a screw 34b as occasion demands, at a time of forming the rubber ribbon 20, the rubber ribbon 20 formed as a single layer of the nonconductive rubber 21 can be obtained as shown in FIG. 5(A). The actuation of the gear pump within the head portion 34e and the screw 34b as mentioned above is controlled by the control apparatus 32, and it is possible to freely carry out a switching between the single layer and the double layer of the rubber ribbon.

In a stage of forming the first cap portion 12L in FIG. 4(B), the conductive rubber 22 is partly provided in the rubber ribbon 20 in the course of winding, and the conductive portion 13 is formed by the conductive rubber 22. As mentioned above, the conductive portion 13 extends to the inner side in the tire radial direction from the position on the ground-contacting surface which is separated from the tire equator C to the left side at the distance which is equal to or more than 10% of the ground-contacting width so as to reach the outer peripheral surface of the base portion 11, and extends to the left side between the cap portion 12 and the base portion 11.

Figure 4C:
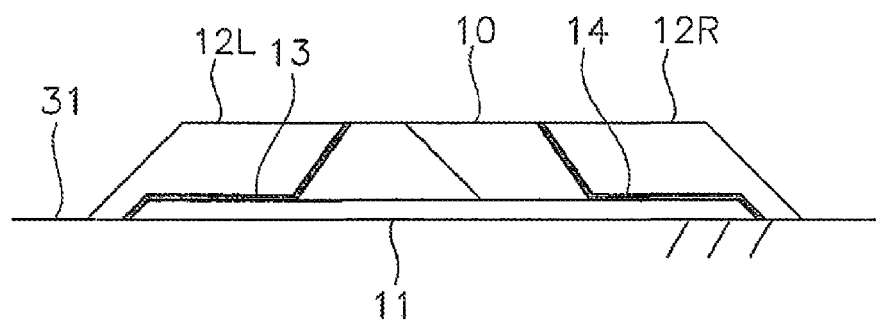

Next, as shown in FIG. 4(C), a second cap portion 12R coming to a right portion of the cap portion 12 is formed in an outer peripheral surface in a right side of the base portion 11. With this configuration, the cap portion 12 is finished, and the tread rubber 10 shown in FIG. 2 is formed. The second cap portion 12R is formed by spirally winding the second rubber ribbon constructed by the nonconductive rubber along the tire circumferential direction while utilizing the ribbon winding construction method.

The second rubber ribbon is formed by the nonconductive rubber, and is provided partly with the conductive rubber as occasion demands, in the same manner as the first rubber ribbon 20. In the present embodiment, there is shown an example in which the first cap portion 12L is formed, the rubber ribbon 20 fed from the rubber ribbon feeding apparatus 30 is thereafter used as the second rubber ribbon, whereby the second cap portion 12R is formed.

In a stage of forming the second cap portion 12R in FIG. 4(C), the conductive rubber 22 is partly provided in the rubber ribbon 20 in the course of winding, and the conductive portion 14 is formed by the conductive rubber 22. As mentioned above, the conductive portion 14 extends to the inner side in the tire radial direction from the position on the ground-contacting surface which is separated from the tire equator C to the right side at the distance which is equal to or more than 10% of the ground-contacting width so as to reach the outer peripheral surface of the base portion 11, and extends to the right side between the cap portion 12 and the base portion 11.

Figure 7:
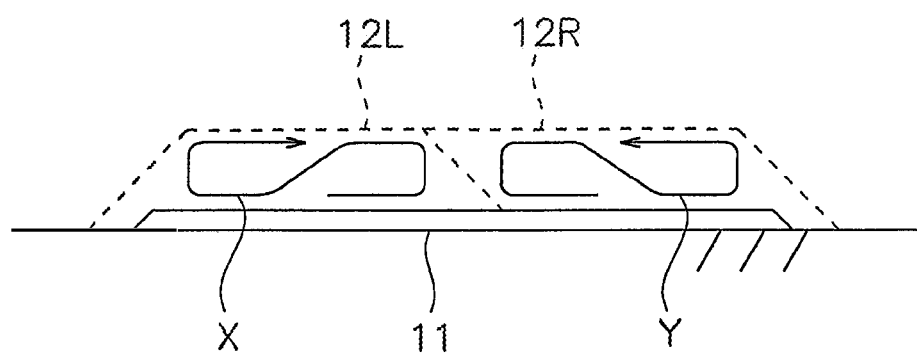
FIG. 7 is a conceptual view showing a moving route of a winding position of the rubber ribbon.

FIG. 7 conceptually shows an example of a moving route of a winding position of the rubber ribbon 20, in the forming step of the tread rubber shown in FIG. 4. The first rubber ribbon is wound along a route X formed as a transversely figure of 8 shape, in the stage of forming the first cap portion 12L, and the second rubber ribbon is wound along a route Y formed as a transversely figure of 8 shape which is inverted to the route X, in the stage of forming the second cap portion 12R.

Figure 8A:
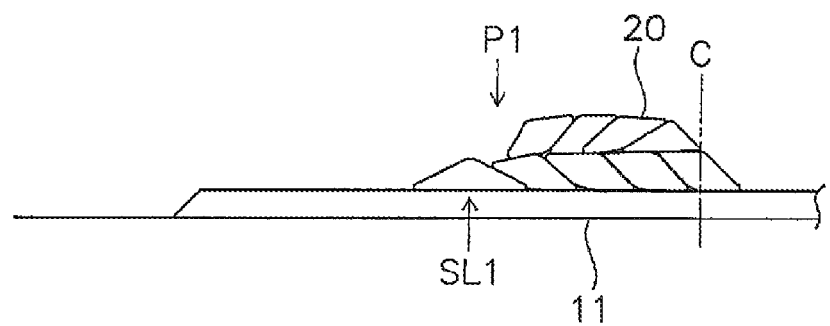
FIGS. 8(A) to 8(C) are cross sectional views showing a process of winding a first rubber ribbon.
Figure 8B:
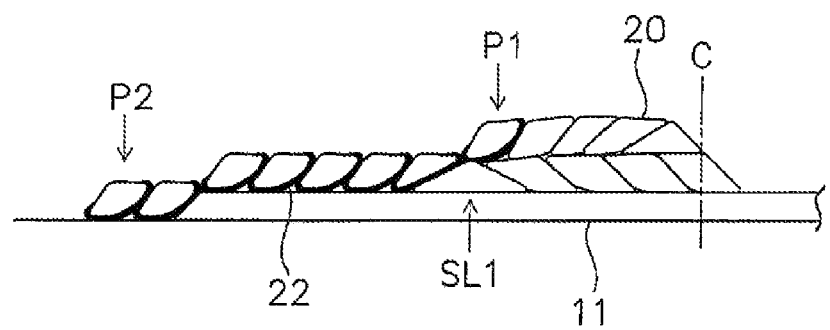
Figure 8C:
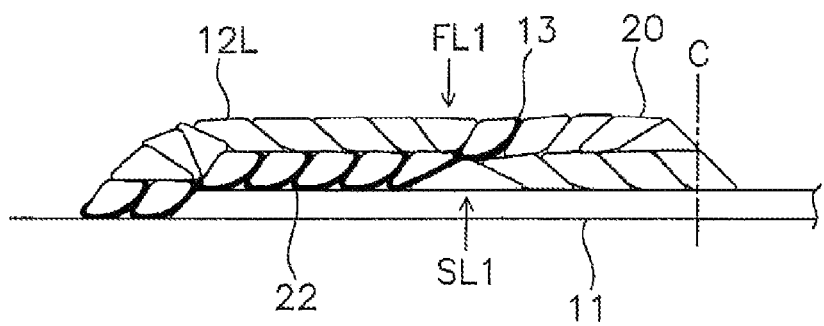

Specifically, the first rubber ribbon 20 is wound as shown in FIG. 8, in the stage of forming the first cap portion 12L. In other words, as shown in FIGS. 8(A) to 8(C) sequentially, the winding position of the rubber ribbon 20 moves to a right side from a start point SL1 which is separated from the tire equator C to a left side, next turns back to the left side so as to pass through the start point SL1, next passes through an end portion in the left side of the base portion 11, and thereafter turns back to the right side so as to reach an end point FL1.

At this time, the conductive rubber 22 is provided in the rubber ribbon 20 as shown in FIG. 5(B), in a section from a position P1 which is after turning back to the left side and before passing through the start point SL1, to a position P2 which passes through the left end portion of the base portion 11. The conductive rubber 22 constructs the conductive portion 13 which extends to an inner side in a tire radial direction from a position on the ground-contacting surface which is separated from the tire equator C to the left side at a distance equal to or more than 10% of the ground-contacting width, so as to reach the outer peripheral surface of the base portion 11, and extends to the left side between the cap portion 12 and the base portion 11.

Figure 9A:
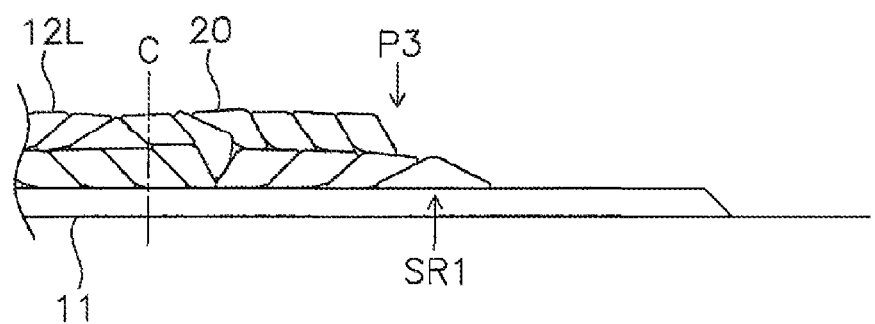
FIGS. 9(A) to 9(C) are cross sectional views showing a process of winding a second rubber ribbon.
Figure 9B:
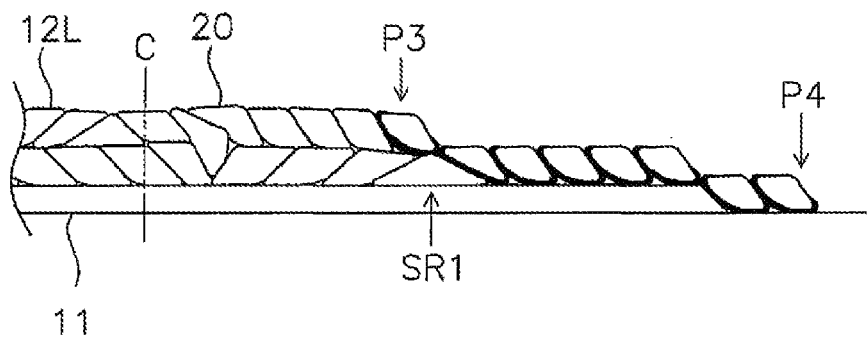
Figure 9C:
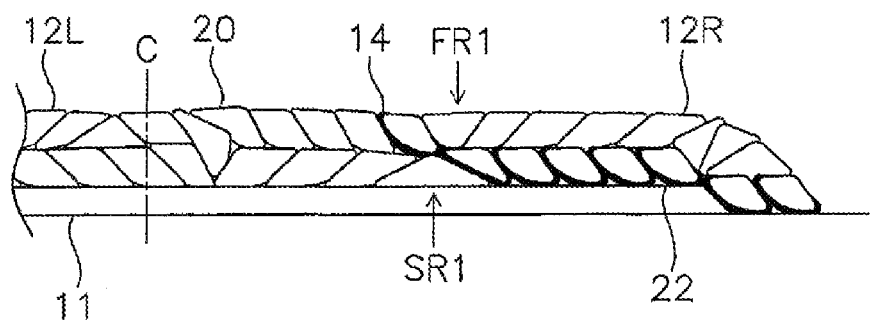

Further, the second rubber ribbon 20 is wound as shown in FIG. 9, in the stage of forming the second cap portion 12R. In other words, as shown in FIGS. 9(A) to 9(C) sequentially, the winding position of the rubber ribbon 20 moves to a left side from a start point SR1 which is separated from the tire equator C to a right side, next turns back to the right side so as to pass through the start point SR1, next passes through an end portion in the right side of the base portion 11, and thereafter turns back to the left side so as to reach an end point FR1.

At this time, the conductive rubber 22 is provided in the rubber ribbon 20 as shown in FIG. 5(B), in a section from a position P3 which is after turning back to the right side and before passing through the start point SR1, to a position P4 which passes through the right end portion of the base portion 11. The conductive rubber 22 constructs the conductive portion 14 which extends to an inner side in a tire radial direction from a position on the ground-contacting surface which is separated from the tire equator C to the right side at a distance equal to or more than 10% of the ground-contacting width, so as to reach the outer peripheral surface of the base portion 11, and extends to the right side between the cap portion 12 and the base portion 11.

As shown in FIGS. 8 and 9, the rubber ribbon 20 provided with the conductive rubber 22 is wound in such a manner that the end portion of the conductive rubber 22 comes into contact with an abdominal part of the conductive rubber 22 of the adjacent rubber ribbon 20. Accordingly, the conductive portions 13 and 14 have the portions shown in FIG. 4, and additionally a plurality of branch-shaped portions which are branched to the ground-contacting surface side from the portions and terminate halfway, however, an illustration thereof is omitted. The conductive portions 13 and 14 are not limited to such a structure that is provided with the branch-shaped portions mentioned above.

In the present embodiment, the end portion in the right side of the first cap portion 12L is tapered so as to form a slant surface, in the stage of forming the first cap portion 12L. Next, the rubber ribbon 20 is wound around the slant surface as shown in FIG. 9(B), and the end portion in the left side of the second cap portion 12R is formed so as to be overlapped with the end portion in the right side of the first cap portion 12L, in the stage of forming the second cap portion 12R. With this method, the second cap portion 12R is easily connected to the first cap portion 12L.

Since the cap portion 12 is constructed by the first cap portion 12L and the second cap portion 12R in the examples in FIGS. 4 and 7, the cap portion 12 can be formed by winding the rubber ribbon 20 twice, and it is advantageous for improving productivity. Further, since the start points SL1 and SR1 and the end points FL1 and FR1 for winding the rubber ribbon are set so as to be spaced at the distance which is at least 10% of the ground-contacting width from the tire equator, it is possible to prevent an increase of RRO so as to improve the uniformity.

Although an illustration is omitted, the belt layer 6 and the belt reinforcing layer 8 are arranged in the inner periphery of the formed tread rubber 10. After the forming step of the tread rubber, the step proceeds to a forming step of a green tire, whereby the green tire is formed by mounting the tread rubber 10 on the outer peripheral surface of the carcass layer 7 which is formed as the toroidal shape, and combining with the other tire constructing members. Thereafter, the step proceeds to a curing step of the green tire, and the pneumatic tire T shown in FIG. 1 is manufactured by applying a curing process to the green tire.

Second Aspect Relating to Forming Step of Tread Rubber

Figure 10A:
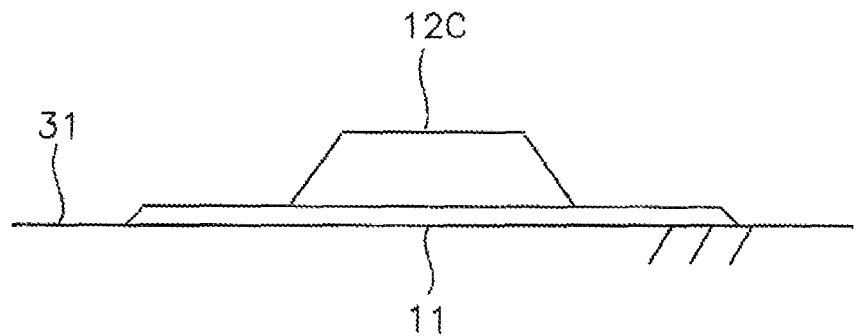
FIGS. 10(A) to 10(C) are cross sectional views schematically showing a forming step of the tread rubber.

Since a forming step of the tread rubber 10 shown in FIG. 10 is the same as the step described in FIG. 4 except the below describing matters, a description will be given mainly of different points while omitting the common points. The step of FIG. 10 includes a stage of forming the third cap portion 12C coming to a center portion in the tire width direction of the cap portion 12, after the stage of forming the base portion 11, as shown in FIG. 10(A). The third cap portion 12C is formed by a nonconductive rubber, and may utilize any of the extrusion forming method and the ribbon winding construction method.

Figure 10B:
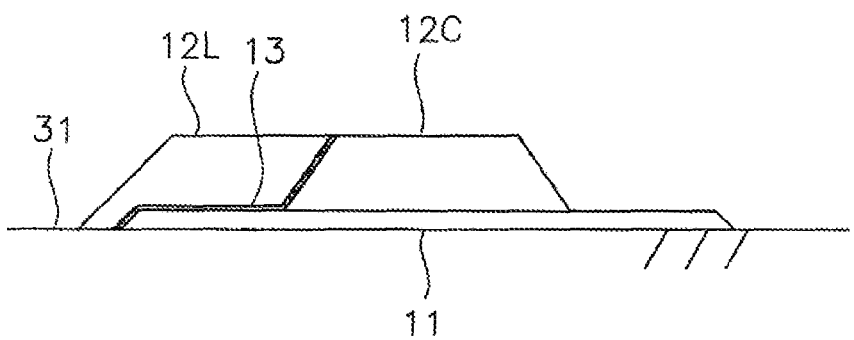
Figure 10C:
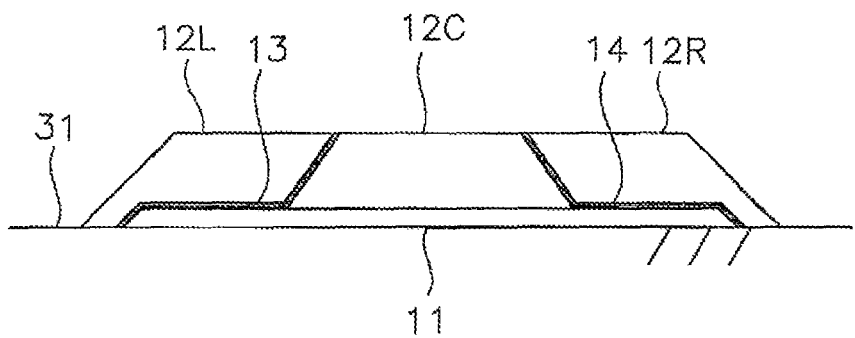

FIG. 10(B) shows a stage of forming the first cap portion 12L which comes to the left portion of the cap portion 12. The conductive portion 13 is formed by the conductive rubber 22 which is provided in the rubber ribbon 20 in the course of winding. FIG. 10(C) shows a stage of forming the second cap portion 12R which comes to the right portion of the cap portion 12. The conductive portion 14 is formed by the conductive rubber 22 which is provided in the rubber ribbon 20 in the course of winding.

Figure 11:
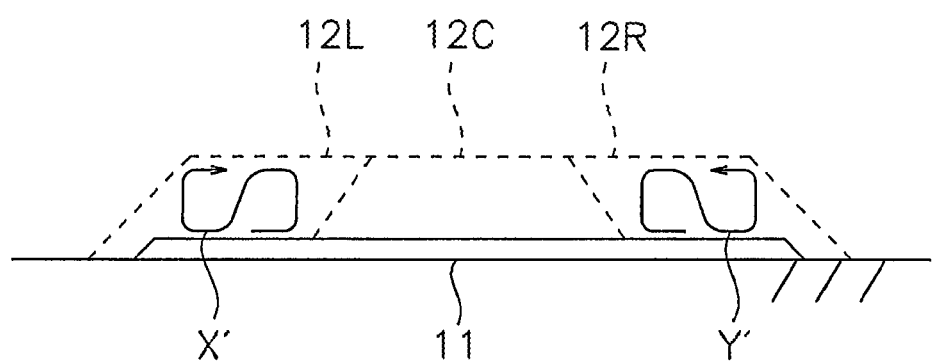
FIG. 11 is a conceptual view showing a moving route of a winding position of the rubber ribbon.

FIG. 11 conceptually shows an example of a moving route of a winding position of the rubber ribbon 20, in the forming step of the tread rubber shown in FIG. 10. The first rubber ribbon is wound along a route X' formed as a transversely figure of 8 shape, in the stage of forming the first cap portion 12L, and the second rubber ribbon is wound along a route Y' formed as a transversely figure of 8 shape which is inverted to the route X', in the stage of forming the second cap portion 12R.

Figure 12A:
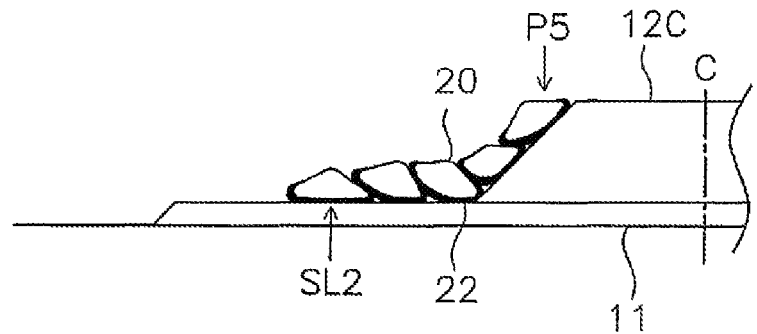
FIGS. 12(A) to 12(C) are cross sectional views showing a process of winding the first rubber ribbon.
Figure 12B:
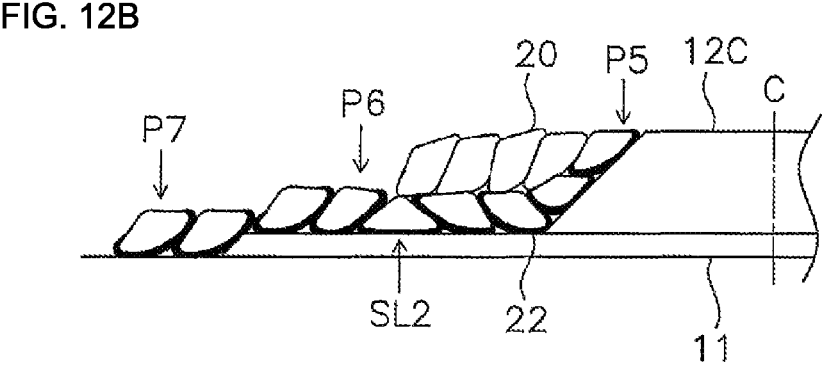
Figure 12C:
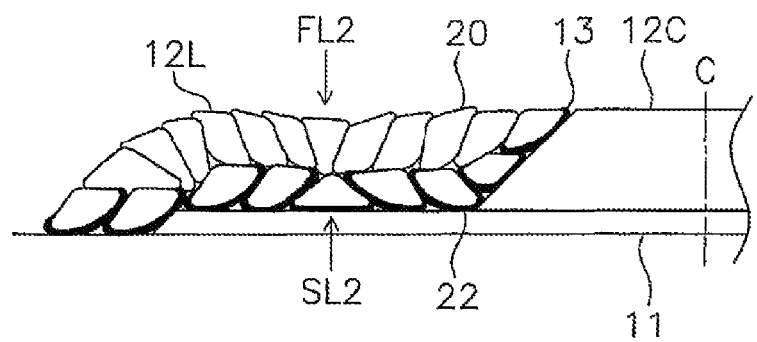

Specifically, the first rubber ribbon 20 is wound as shown in FIG. 12, in the stage of forming the first cap portion 12L. In other words, as shown in FIG. 12(A) to 12(C) sequentially, the winding position of the rubber ribbon 20 moves to a right side from a start point SL2 which is separated from the tire equator C to a left side, next turns back to the left side so as to pass through the start point SL2, next passes through an end portion in the left side of the base portion 11, and thereafter turns back to the right side so as to reach an end point FL2.

At this time, the conductive rubber 22 is provided in the rubber ribbon 20 in a section from the start point SL2 to a position P5 which turns back to the left side, and a section from a position P6 which comes to just after passing through the start point SL2 to a position P7 which passes through the end portion in the left side of the base portion 11. The conductive rubber 22 constructs the conductive portion 13 which extends to an inner side in a tire radial direction from a position on the ground-contacting surface which is separated from the tire equator C to the left side at a distance equal to or more than 10% of the ground-contacting width, so as to reach the outer peripheral surface of the base portion 11, and extends to the left side between the cap portion 12 and the base portion 11.

Figure 13A:
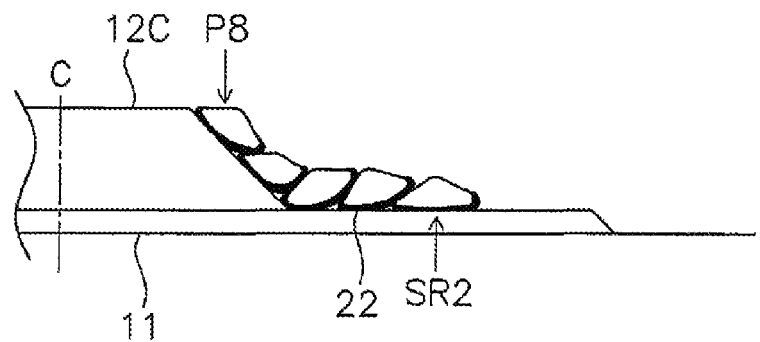
FIGS. 13(A) to 13(C) are cross sectional views showing a process of winding the second rubber ribbon.
Figure 13B:
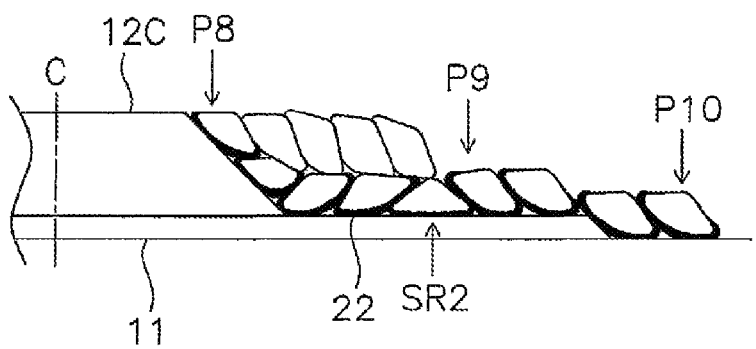
Figure 13C:
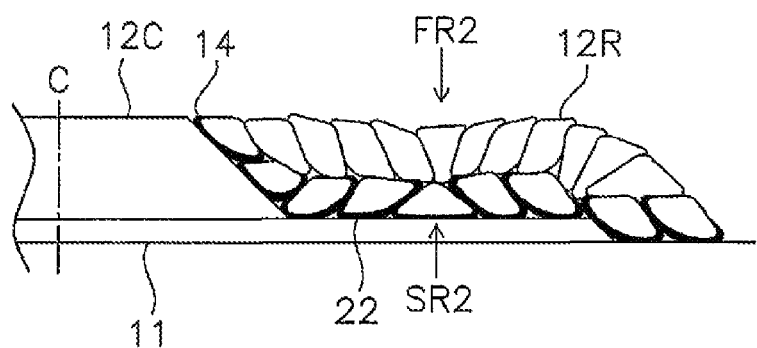

Further, the second rubber ribbon 20 is wound as shown in FIG. 13, in the stage of forming the second cap portion 12R. In other words, as shown in FIG. 13(A) to 13(C) sequentially, the winding position of the rubber ribbon 20 moves to a left side from a start point SR2 which is separated from the tire equator C to a right side, next turns back to the right side so as to pass through the start point SR2, next passes through an end portion in the right side of the base portion 11, and thereafter turns back to the left side so as to reach an end point FR2.

At this time, the conductive rubber 22 is provided in the rubber ribbon 20 in a section from the start point SR2 to a position P8 which turns back to the right side, and a section from a position P9 which comes to just after passing through the start point SR2 to a position P10 which passes through the end portion in the right side of the base portion 11. The conductive rubber 22 constructs the conductive portion 14 which extends to an inner side in a tire radial direction from a position on the ground-contacting surface which is separated from the tire equator C to the right side at a distance equal to or more than 10% of the ground-contacting width, so as to reach the outer peripheral surface of the base portion 11, and extends to the right side between the cap portion 12 and the base portion 11.

In the present embodiment, the end portions in the both side of the third cap portion 12C is tapered so as to form a slant surface, in the stage of forming third cap portion 12C. And, the rubber ribbon 20 is wound around the slant surface as shown in FIG. 12(A), and the end portion in the right side of the first cap portion 12L is formed so as to be overlapped with the end portion in the left side of the third cap portion 12C, in the stage of forming the first cap portion 12L. Further, the rubber ribbon 20 is wound around the slant surface as shown in FIG. 13(A), and the end portion in the left side of the second cap portion 12R is formed so as to be overlapped with the end portion in the right side of the third cap portion 12C, in the stage of forming the second cap portion 12R.

With this method, it is possible to accurately connect the first cap portion 12L and the second cap portion 12R to the third cap portion 12C so as to uniformly form the cap portion 12. In addition, it is possible to easily form the inclined portions of the conductive portions 13 and 14 which reach the outer peripheral surface of the base portion 11 from the ground-contacting surface, by the conductive rubber 22 of the rubber ribbon 20 which is wound along the inclined surface.

In accordance with the examples in FIGS. 10 and 11, it is possible to suppress the range in which the first and second rubber ribbons relating to the formation of the conductive portion are wound, in comparison with the examples in FIGS. 4 and 7 which are not provided with the third cap portion in the center portion. In addition, since it is possible to set the start points SL2 and SR2 and the endpoints FL2 and FR2 for winding the rubber ribbon precisely away from the tire equator, it is possible to prevent the increase of the RRO so as to well improve the uniformity.

Third Aspect Relating to Forming Step of Tread Rubber

Since a forming step of the tread rubber 10 shown in FIG. 14 is the same as the already described step except the below described matters, a description will be given mainly of different points while omitting the common points. The step in FIG. 14 includes a stage of forming the third cap portion 12C which comes to the center portion in the tire width direction of the cap portion 12 after the stage of forming the base portion 11, in the same manner as the step in FIG. 10. In addition, the rubber ribbon 20 is wound in accordance with the same procedure as the step in FIG. 4.

Figure 14A:
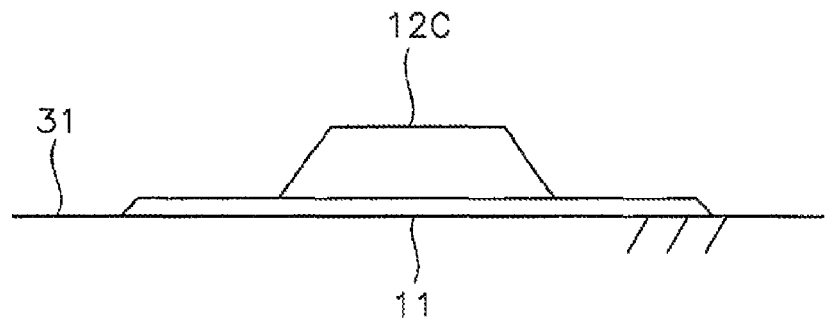
FIGS. 14(A) to 14(C) are cross sectional views schematically showing a forming step of the tread rubber.
Figure 14B:
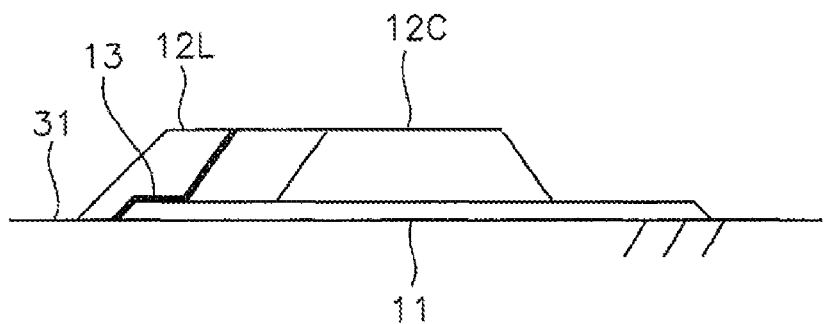
Figure 14C:
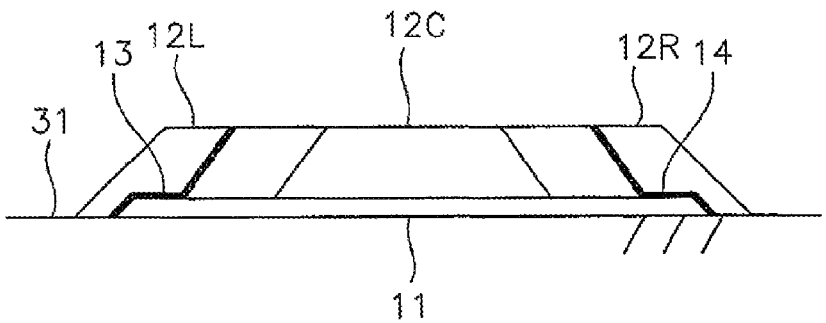

In FIG. 14, FIG. 14(A) shows a stage of forming a third cap portion 12C, FIG. 14(B) shows a stage of forming a first cap portion 12L, and FIG. 14(C) shows a stage of forming a second cap portion 12R. The conductive portions 13 and 14 are formed by the conductive rubber 22 which is provided in the rubber ribbon 20 in the course of winding respectively. A moving route of a winding position of the rubber ribbon 20 is exemplified in FIG. 11.

Figure 15A:
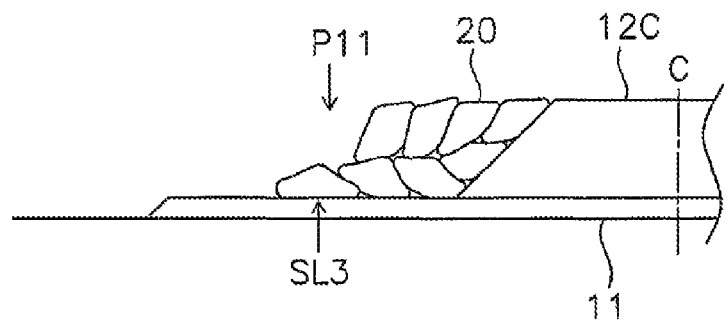
FIGS. 15(A) to 15(C) are cross sectional views showing a process of winding the first rubber ribbon.
Figure 15B:
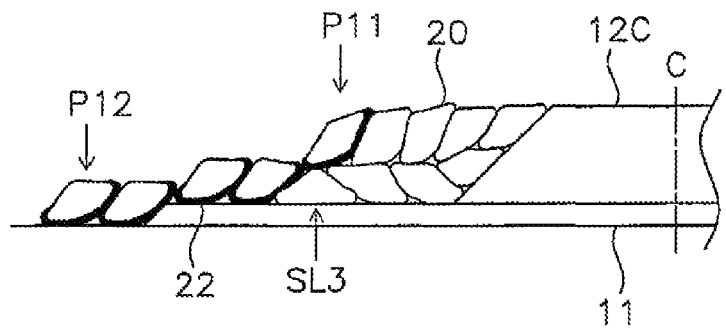
Figure 15C:
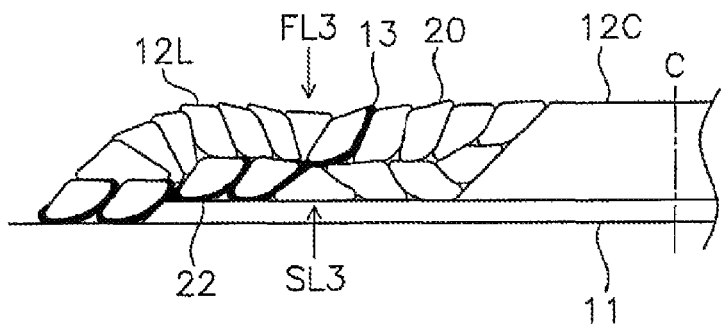

The first rubber ribbon 20 is wound as shown in FIG. 15, in the stage of forming the first cap portion 12L. In other words, as shown in FIG. 15(A) to 15(C) sequentially, the winding position of the rubber ribbon 20 moves to a right side from a start point SL3 which is separated from the tire equator C to a left side, next turns back to the left side so as to pass through the start point SL3, next passes through an end portion in the left side of the base portion 11, and thereafter turns back to the right side so as to reach an end point FL3. At this time, the conductive rubber 22 is provided in the rubber ribbon 20 in a section from a position P11 which is after turning back to a left side and before passing through the start point SL3, to a position P12 which passes through an end portion in the left side of the base portion 11, thereby constructing the conductive portion 13.

Figure 16A:
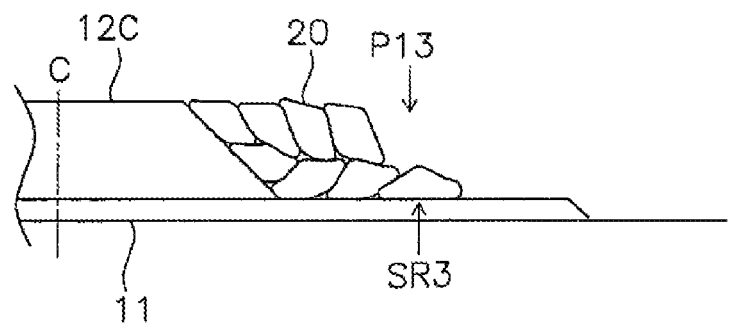
FIGS. 16(A) to 16(C) are cross sectional views showing a process of winding the second rubber ribbon.
Figure 16B:
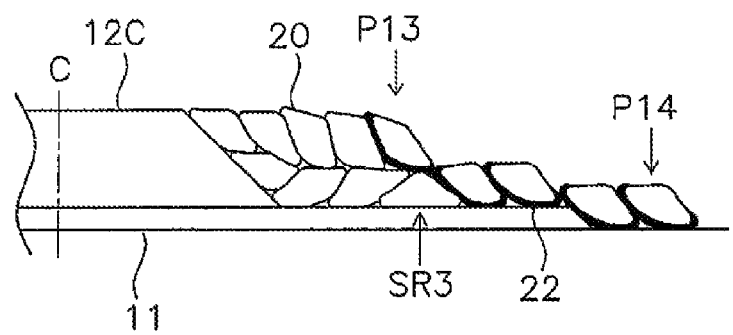
Figure 16C:
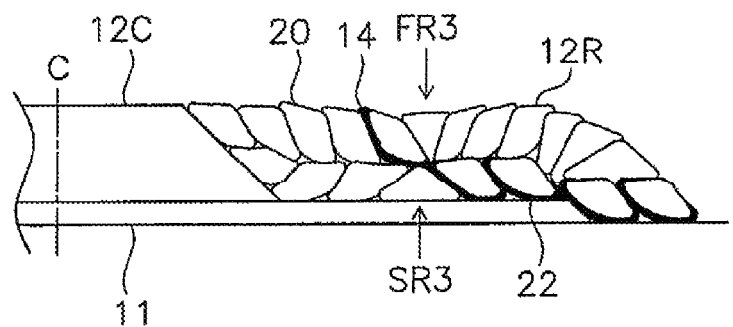

The second rubber ribbon 20 is wound as shown in FIG. 16, in the stage of forming the second cap portion 12R. In other words, as shown in FIG. 16(A) to 16(C) sequentially, the winding position of the rubber ribbon 20 moves to a left side from a start point SR3 which is separated from the tire equator C to a right side, next turns back to the right side so as to pass through the start point SR3, next passes through an end portion in the right side of the base portion 11, and thereafter turns back to the left side so as to reach an endpoint FR3. At this time, the conductive rubber 22 is provided in the rubber ribbon 20 in a section from a position P13 which is after turning back to a right side and before passing through the start point SR3, to a position P14 which passes through the end portion in a right side of the base portion 11, thereby constructing the conductive portion 14.

In the present embodiment, both end portions in the tire width direction of the third cap portion 12C are formed as a tapered shape. In addition, an end portion in a right side of the first cap portion 12L is overlapped with an end portion in a left side of the third cap portion 12C, and an end portion in a left side of the second cap portion 12R is overlapped with an end portion in a right side of the third cap portion 12C. With this method, it is possible to accurately connect the first cap portion 12L and the second cap portion 12R to the third cap portion 12C so as to uniformly form the cap portion 12.

Fourth Aspect Relating to Forming step of Tread Rubber

Since a forming step of the tread rubber 10 shown in FIG. 17 is the same as the previously described step except the below described matters, a description will be given mainly of different point while omitting the common points. In the step in FIG. 17, as shown by (A), a stage of forming an inner cap 12i which is narrower than the base portion 11 by a non-conductive rubber in the center portion in the tire width direction of the outer peripheral surface of the base portion 11 is included after the stage of forming the base portion 11.

The formation of the inner cap 12i may utilize any of the extrusion forming method and the ribbon winding construction method. The inner cap 12i is arranged in the center area including the tire equator, and the rate of the width of the inner cap 12i with respect to the tread width is, for example, between 20 and 80%, and preferably between 30 and 70%. The inner cap 12i is formed thinner than the first cap portion 12L and the second cap portion 12R, and is formed such a shape that the thickness of the end portion is reduced little by little.

Figure 17A:
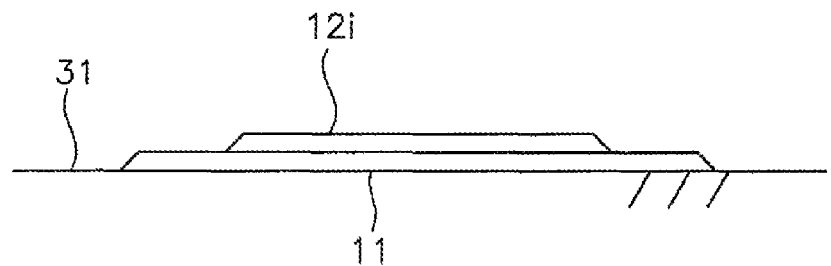
FIGS. 17(A) to 17(C) are cross sectional views schematically showing a forming step of the tread rubber.
Figure 17B:
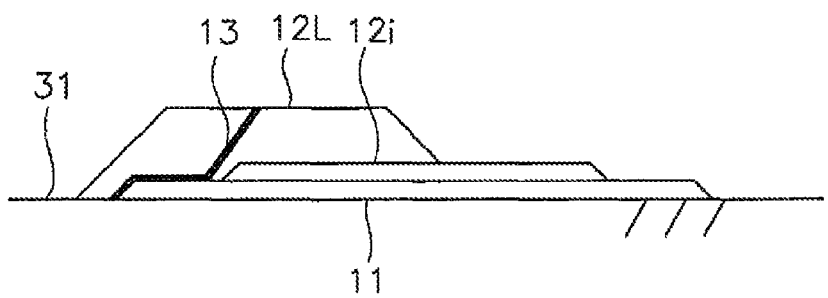
Figure 17C:
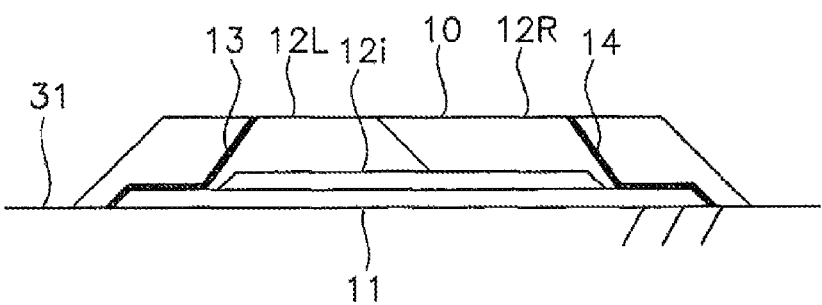

In FIG. 17, FIG. 17(A) shows a stage of forming the inner cap 12i, FIG. 17(B) shows a stage of forming the first cap portion 12L, and FIG. 17(C) shows a stage of forming the second cap portion 12R. The conductive portions 13 and 14 are formed by the conductive rubber 22 which is provided in the rubber ribbon 20 in the course of winding respectively. A moving route of the winding position of the rubber ribbon 20 is exemplified in FIG. 18. The first rubber ribbon is wound along a route X" formed as a transversely figure of 8 shape, and the second rubber ribbon is wound along a route Y" formed as a transversely figure which is opposed thereto.

Figure 19A:
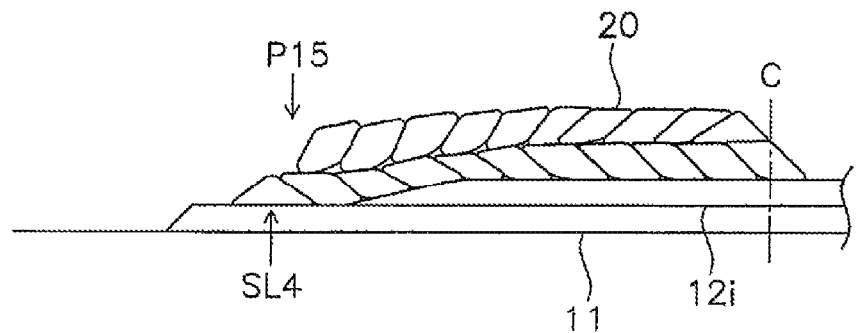
FIGS. 19(A) to 19(C) are cross sectional views showing a process of winding the first rubber ribbon.
Figure 19B:
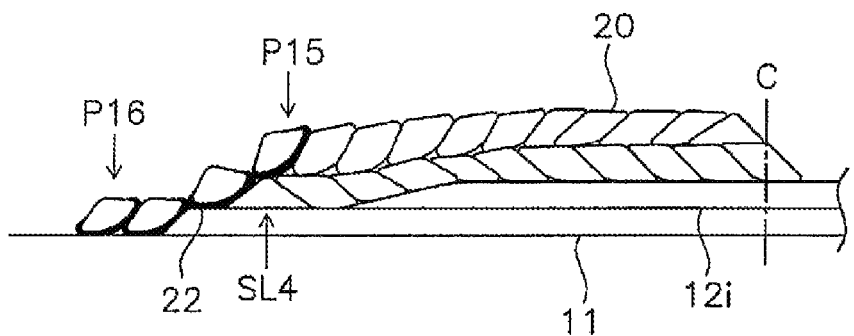
Figure 19C:
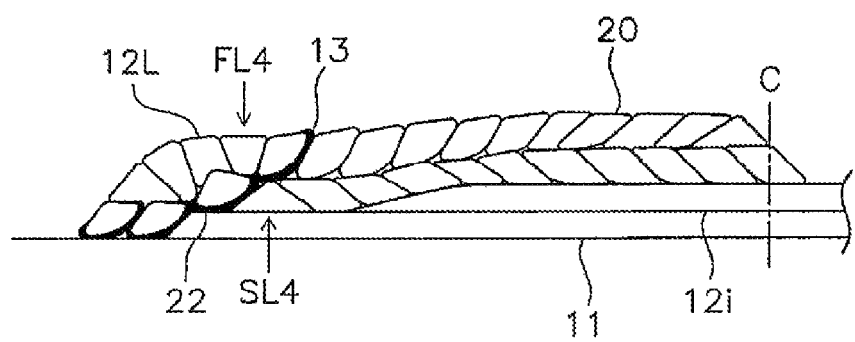

Specifically, the first rubber ribbon 20 is wound as shown in FIG. 19, in the stage of forming the first cap portion 12L. In other words, as shown in FIGS. 19(A) to 19(C) sequentially, the winding position of the rubber ribbon 20 moves to a right side from a start point SL4 which is separated from the tire equator C to a left side, next turns back to the left side so as to pass through the start point SL4, next passes through an end portion in a left side of the base portion 11, and thereafter turns back to a right side so as to reach an end point FL4. At this time, the conductive rubber 22 is provided in the rubber ribbon 20 in a section from a position P15 which is after turning back to the left side and before passing through the start point SL4, to a position P16 which passes through the end portion in the left side of the base portion 11, thereby constructing the conductive portion 13.

Figure 20A:
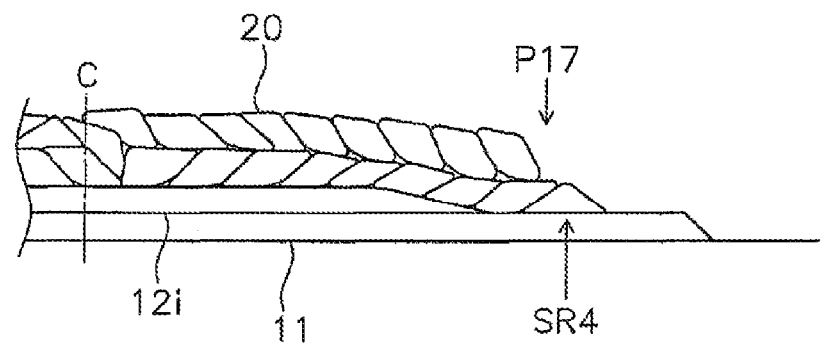
FIGS. 20(A) to 20(C) are cross sectional views showing a process of winding the second rubber ribbon.
Figure 20B:
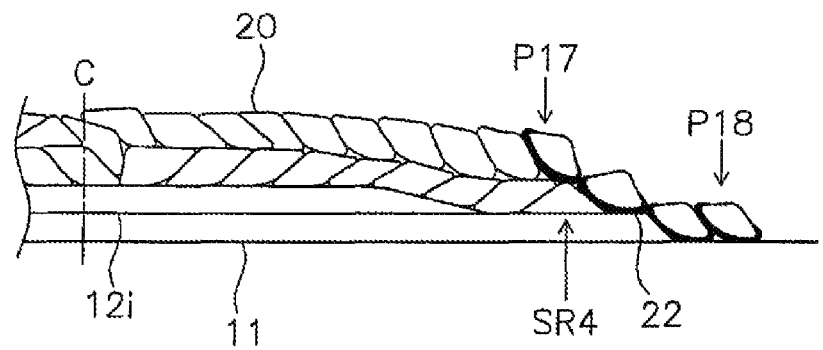
Figure 20C:
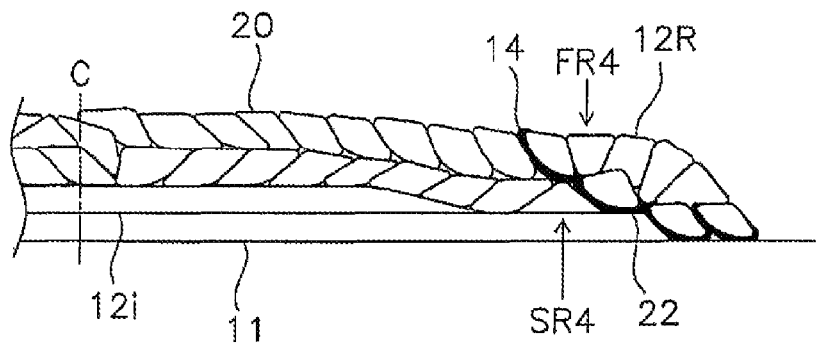

In the stage of forming the second cap portion 12R, the second rubber ribbon 20 is wound as shown in FIG. 20. In other words, as shown in FIGS. 20(A) to 20(C) sequentially, the winding position of the rubber ribbon 20 moves to a left side from a start point SR4 which is separated from the tire equator C to a right side, next turns back to the right side so as to pass through the start point SR4, next passes through an end portion in a right side of the base portion 11, and thereafter turns back to a left side so as to reach an end point FR4. At this time, the conductive rubber 22 is provided in the rubber ribbon 20 in a section from a position P17 which is after turning back to the right side and before passing through the start point SR4, to a position P18 which passes through the end portion in the right side of the base portion 11, thereby constructing the conductive portion 14.

As mentioned above, it is possible to easily secure the thickness of the center portion of the tread rubber 10 by previously forming the inner cap 12i at a time of forming the cap portion 12, and it is easy to form the tread rubber 10 by a desired shape. Further, in FIG. 17, if the member formed in (A) is transferred to a different manufacturing line, thereby executing the thereafter steps, it is possible to execute the stage (A) with respect to the next product during the execution of the stages (B) and (C). Accordingly, a cycle time can be shortened and this is convenient.

Figure 18:
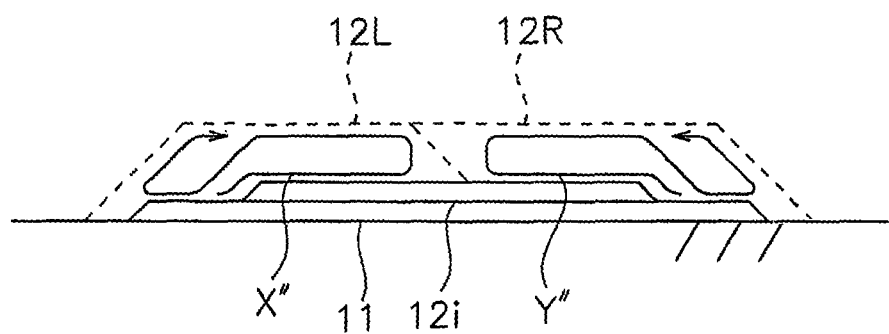
FIG. 18 is a conceptual view showing a moving route of a winding position of the rubber ribbon.

In FIGS. 17 and 18, there is shown the example in which the end portion of the second cap portion 12R is formed so as to overlap the end portion of the first cap portion 12L, however, the third cap portion as mentioned above may be formed after forming the inner cap 12i. After forming the third cap portion, the conductive portions 13 and 14 can be formed in accordance with a procedure shown in FIGS. 12 and 13, or a procedure shown in FIGS. 15 and 16.

With regard to the first to fourth aspects, in the embodiment mentioned above, there is shown the example in which the first cap portion and the second cap portion are formed in accordance with the same procedure, however, the present invention is not limited to them. Accordingly, for example, it is possible to form the first cap portion in accordance with a procedure in FIG. 12, and form the second cap portion in accordance with a procedure in FIG. 16.

The present invention is not limited to the embodiment mentioned above, but can be improved and modified variously within the scope which does not depart from the purpose of the present invention.

Example

An example tire which concretely shows the structure and effect of the present invention will be explained. An evaluation of each of performances is executed as follows.

(1) Electrical Conduction Performance (Electric Resistance Value)

An electric resistance value was measured by applying a predetermined load to the tire installed to the rim, and applying an applied voltage (500V) to a metal plate with which the tire grounds from the shaft supporting the rim.

(2) Uniformity

Based on a test method defined in JISD4233, LFV (lateral force variation) was measured. Specifically, an amount of fluctuation of a force in a tire lateral direction which is generated at a time of rotating the tire while pressing it against a rotating drum was measured, and an evaluation was carried out with an inverse number of a measured value. A result of a comparative example 1 is set to 100 so as to be indexed, and the greater numerical value indicates a more excellent uniformity.

(3) Rolling Resistance

A rolling resistance was measured by a rolling resistance tester, and was evaluated based on an inverse number thereof. A comparative example 1 is set to 100 and a result is evaluated with indices, the more the numeric value is the less the rolling resistance and the more excellent.

In the tire (tire size: 245/55R19) having the structure shown in FIG. 1, the distances D13 and D14 are set as shown in Table 1, and comparative examples 1 to 3 and examples 1 to 5 are set. The first conductive portion is not provided in the comparative example 1 and the comparative example 3. Further, the tread pattern of each of the examples is a symmetrical block pattern, however, only in the example 4, a region in a side in which the second conductive portion is provided is formed as a rib pattern. Accordingly, in the example 4, the positions of the circumferential main grooves are identical between the right and left sides, however, a groove area of a region in a side in which the first conductive portion is provided is larger than a groove area of a region in a side in which the second conductive portion is provided. The example 5 is formed in accordance with the third aspect mentioned above.

TABLE 1

| | comparative examples 1 | comparative examples 2 | comparative examples 3 | example 1 | example 2 | example 3 | example 4 | example 5 |
|---|---|---|---|---|---|---|---|---|
| D13/CW(%) | — | 5 | — | 10 | 20 | 40 | 40 | 20 |
| D14/CW(%) | 5 | 5 | 20 | 10 | 20 | 40 | 20 | 20 |
| manufacturing method of tread rubber | extrusion forming | extrusion forming | extrusion forming | extrusion forming | extrusion forming | extrusion forming | extrusion forming | ribbon winding |
| electric resistance (MΩ) | 100 or more | 100 or more | 3 | 3 | 3 | 3 | 3 | 3 |
| uniformity | 100 | 105 | 100 | 105 | 107 | 111 | 104 | 117 |
| rolling resistance | 100 | 99 | 100 | 100 | 100 | 101 | 100 | 101 |

In the comparative examples 1 and 2, the exposure of the conductive portion is inhibited by the covered state, and the electrical conduction performance is not appropriately generated. In the comparative example 3, since the conductive portion is provided only in one side in the tire width direction, the uniformity is relatively bad. On the contrary, in the examples 1 to 5, it is possible to appropriately achieve the electrical conduction performance while holding down the deterioration of the uniformity.

What is claimed is:

1. A pneumatic tire comprising:
a pair of bead portions;
side wall portions each of which extends to an outer side in a tire radial direction from each of the bead portions;
a tread portion which is connected to an outer end in the tire radial direction of each of the side wall portions;
a toroidal carcass layer which is provided between the pair of bead portions;
a side wall rubber which is provided in an outer side of the carcass layer in the side wall portion; and
a tread rubber which is provided in an outer side of the carcass layer in the tread portion,
wherein the tread rubber has a cap portion which is formed by a nonconductive rubber and constructs a ground-contacting surface, a base portion which is formed by the nonconductive rubber and is provided in an inner side in the tire radial direction of the cap portion, and a pair of conductive portions which are formed by a conductive rubber and are exposed in the ground-contacting surface, and
wherein the pair of conductive portions comprises:
a first conductive portion which extends to an inner side in the tire radial direction from the ground-contacting surface so as to reach an outer peripheral surface of the base portion, extends to one side in a tire width direction between the cap portion and the base portion, is connected to a topping rubber of the carcass layer or the side wall rubber, and is separated at an exposed position on the ground-contacting surface from a tire equator to one side in the tire width direction at a distance which is equal to or more than 10% of a ground-contacting width; and
a second conductive portion which extends to an inner side in the tire radial direction from the ground-contacting surface so as to reach an outer peripheral surface of the base portion, extends to another side in the tire width direction between the cap portion and the base portion, is connected to the topping rubber of the carcass layer or the side wall rubber, and is separated at an exposed position on the ground-contacting surface from the tire equator to another side in the tire width direction at a distance which is equal to or more than 10% of the ground-contacting width, and wherein a groove area of a region which comes to one side in the tire width direction of the ground-contacting surface is larger than a groove area of a region which comes to another side in the tire width direction based on the tire equator, and a distance from the exposed position on the ground-contacting surface of the first conductive portion to the tire equator is longer than a distance from the exposed position on the ground-contacting surface of the second conductive portion to the tire equator.

2. The pneumatic tire according to claim 1, wherein a circumferential main groove is formed on a surface of the tread rubber, while avoiding a section in which the first conductive portion and the second conductive portion extend to the inner side in the tire radial direction from the ground-contacting surface so as to reach an outer peripheral surface of the base portion.

* * * * *